(12) United States Patent
Jeon et al.

(10) Patent No.: US 11,802,656 B2
(45) Date of Patent: Oct. 31, 2023

(54) DISPLAY APPARATUS AND TILED DISPLAY APPARATUS INCLUDING THE SAME

(71) Applicant: LG DISPLAY CO., LTD., Seoul (KR)

(72) Inventors: Eungi Jeon, Paju-si (KR); Sunghwan Yoon, Paju-si (KR); YoungKyu Bang, Paju-si (KR); Heeseung Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 17/557,116

(22) Filed: Dec. 21, 2021

(65) Prior Publication Data

US 2022/0205588 A1 Jun. 30, 2022

(30) Foreign Application Priority Data

Dec. 30, 2020 (KR) .................. 10-2020-0188189

(51) Int. Cl.
| | | |
|---|---|---|
| *F16M 11/00* | (2006.01) | |
| *F16M 13/02* | (2006.01) | |
| *G06F 3/14* | (2006.01) | |
| *G09G 5/00* | (2006.01) | |
| *F16M 11/10* | (2006.01) | |

(52) U.S. Cl.
CPC .......... *F16M 13/022* (2013.01); *F16M 11/10* (2013.01); *G06F 3/1446* (2013.01); *G09G 5/003* (2013.01); *G09G 2300/026* (2013.01); *G09G 2300/04* (2013.01); *G09G 2360/122* (2013.01)

(58) Field of Classification Search
CPC .. F16M 13/022; F16M 11/10; F16M 2200/06; F16M 11/043; F16M 11/06; F16M 11/08; F16M 11/041; G06F 3/1446; G09G 5/003; G09G 2300/026; G09G 2300/04; G09G 2360/122; G09F 9/302; G09F 9/3023; F16C 11/04
See application file for complete search history.

(56) References Cited

U.S. PATENT DOCUMENTS

| | | | | | |
|---|---|---|---|---|---|
| 2,637,233 | A | * | 5/1953 | Hoffman ................ | B25B 23/00 81/448 |
| 4,014,504 | A | * | 3/1977 | Sachs ...................... | H02G 7/08 24/135 R |
| 4,461,521 | A | * | 7/1984 | Sachs ..................... | H01R 4/646 174/44 |
| 4,526,428 | A | * | 7/1985 | Sachs ..................... | H02G 7/056 24/115 R |
| 4,589,621 | A | * | 5/1986 | Hunt ...................... | F16M 11/10 248/421 |

(Continued)

FOREIGN PATENT DOCUMENTS

KR 10-1738062 B1 5/2017

*Primary Examiner* — Amy J. Sterling
(74) *Attorney, Agent, or Firm* — POLSINELLI PC

(57) ABSTRACT

A display apparatus including a display module and a support module configured to support the display module, wherein the support module includes: a fixed frame configured to support the display module and a link structure disposed between the fixed frame and the display module and configured to rotate the display module through at least a six-bar link structure, so that the display module is easily detachably attached to the fixed frame, thereby shortening a time for an operation of replacing, repairing, or installation of the display module.

18 Claims, 13 Drawing Sheets

(56) References Cited

U.S. PATENT DOCUMENTS

| | | | | |
|---|---|---|---|---|
| 4,621,782 A * | 11/1986 | Carlson | F16M 11/10 | 248/183.3 |
| 4,695,024 A * | 9/1987 | Haven | B25J 9/06 | 248/281.11 |
| 4,836,486 A * | 6/1989 | Vossoughi | F16M 11/2014 | 248/921 |
| 5,150,710 A * | 9/1992 | Hall | G01R 33/28 | 324/318 |
| 5,163,643 A * | 11/1992 | Auclair | F16G 11/048 | 248/63 |
| 5,772,455 A * | 6/1998 | Auclair | H01R 4/42 | 439/100 |
| 5,842,670 A * | 12/1998 | Nigoghosian | A45D 20/12 | 248/910 |
| 7,011,279 B2 * | 3/2006 | Richter | F16M 11/40 | 248/274.1 |
| 7,226,026 B2 * | 6/2007 | Lin | F16B 47/00 | 248/205.8 |
| 7,543,598 B1 * | 6/2009 | Hygema | D06F 39/088 | 73/866.5 |
| 7,712,712 B2 * | 5/2010 | Richter | B60R 11/02 | 248/205.5 |
| 8,070,434 B2 * | 12/2011 | Sun | F04D 29/601 | 415/214.1 |
| 8,094,438 B2 * | 1/2012 | Dittmer | F16M 11/10 | 361/679.01 |
| 9,016,658 B2 * | 4/2015 | Barnard | F16M 11/40 | 248/688 |
| 9,109,742 B2 * | 8/2015 | Smith | F16M 11/10 | |
| 9,383,060 B2 * | 7/2016 | Geier | F16M 13/02 | |
| 10,232,756 B2 | 3/2019 | Kim et al. | | |
| 10,317,006 B2 * | 6/2019 | Kozlowski, Jr. | F16M 13/02 | |
| D910,160 S * | 2/2021 | Hsu | D23/382 | |
| D923,773 S * | 6/2021 | Wang | D23/382 | |
| 11,141,868 B2 * | 10/2021 | Yim | E04B 1/40 | |
| 11,146,052 B1 * | 10/2021 | Bonen | H02G 7/08 | |
| 11,602,326 B2 * | 3/2023 | Cho | A61B 8/4209 | |
| 2003/0227285 A1 * | 12/2003 | Marasch | G01R 15/202 | 324/117 R |
| 2007/0170320 A1 * | 7/2007 | Sun | F04D 25/08 | 248/177.1 |
| 2009/0039213 A1 * | 2/2009 | Darrow | F16M 11/40 | 396/428 |
| 2009/0134286 A1 * | 5/2009 | Lee | F16M 11/38 | 16/277 |
| 2010/0207006 A1 * | 8/2010 | Kim | F16M 11/10 | 248/284.1 |
| 2010/0277584 A1 * | 11/2010 | Price | F16M 11/18 | 248/422 |
| 2011/0147546 A1 * | 6/2011 | Monsalve | F16M 11/2014 | 248/122.1 |
| 2013/0062490 A1 * | 3/2013 | Godber | F16M 13/022 | 248/274.1 |
| 2013/0134268 A1 * | 5/2013 | Wessells | F16M 11/16 | 248/157 |
| 2014/0168890 A1 * | 6/2014 | Barnard | G06F 1/1626 | 248/181.2 |
| 2016/0356417 A1 * | 12/2016 | Fan | F16M 11/08 | |
| 2017/0086314 A1 * | 3/2017 | Simon | F16M 11/28 | |
| 2018/0119876 A1 * | 5/2018 | Smolinski | F16M 11/40 | |
| 2018/0209582 A1 * | 7/2018 | Petts | F16M 11/10 | |
| 2018/0266625 A1 * | 9/2018 | Balmer | F16M 13/00 | |
| 2019/0049289 A1 * | 2/2019 | Wood | G01G 21/23 | |
| 2021/0207764 A1 * | 7/2021 | Kuo | F16M 11/2021 | |
| 2022/0196201 A1 * | 6/2022 | Rosado | F16M 11/2021 | |
| 2022/0322823 A1 * | 10/2022 | Zhou | G06F 1/1632 | |
| 2022/0325848 A1 * | 10/2022 | Degner | F16M 11/04 | |
| 2022/0415873 A1 * | 12/2022 | Chung | G09F 9/302 | |
| 2023/0049295 A1 * | 2/2023 | Hillyerd | F16M 11/10 | |

\* cited by examiner

DISPLAY APPARATUS AND TILED DISPLAY APPARATUS INCLUDING THE SAME

CROSS-REFERENCE TO RELATED APPLICATION

This application claims the priority of the Korean Patent Application No. 10-2020-0188189 filed on Dec. 30, 2020, which is hereby incorporated by reference in its entirety as if fully set forth herein.

BACKGROUND

Field of the Disclosure

The present disclosure relates to a display apparatus for displaying an image and a tiled display apparatus including the same.

Description of the Background

In general, tiled display apparatuses are apparatuses installed in an indoor or outdoor exhibition hall, a stage, etc. To display various types of visual information, and have gradually been increased in size in line with the development of information technology. In recent years, a large screen is implemented by connecting a plurality of display panels to deliver images in the form of a large screen.

In a tiled display apparatus, one or more display panels are arranged in a matrix form in a quadrangular frame or housing having a predetermined width and length.

Such a tiled display apparatus is installed in such a manner of reinforcing a member for thickness adjustment on a rear surface of a display panel in order to prevent an occurrence of bright lines or dark lines between the display panels adjacent to each other vertically and horizontally.

Meanwhile, the tiled display apparatus not only takes a long time to install because a plurality of display panels should be connected but also is difficult to replace or repair because it is not easy to detachably attach only a broken display panel when one display panel is broken because a plurality of display panels are connected to each other.

SUMMARY

Accordingly, the present disclosure is directed to providing a display apparatus and tiled display apparatus including the same that substantially obviate one or more problems due to limitations and disadvantages of the related art.

An aspect of the present disclosure is directed to providing a display apparatus that facilitates assembly and disassembly of a display panel and a tiled display apparatus including the same.

Additional advantages and features of the disclosure will be set forth in portion in the description which follows and in portion will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including: a display module and a support module configured to support the display module, wherein the support module includes: a fixed frame configured to support the display module and a link structure disposed between the fixed frame and the display module and configured to rotate the display module through at least a six-bar link structure.

In another aspect of the present disclosure, there is provided a display apparatus including: a stand frame; a plurality of support brackets arranged in the stand frame; a plurality of positioning modules individually connected to the plurality of support brackets, respectively; and a plurality of display apparatuses individually tiled to the plurality of positioning modules.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a portion of the present disclosure, illustrate aspects of the disclosure and together with the description serve to explain the principle of the disclosure.

In the drawings.

DETAILED DESCRIPTION

Figure 1:
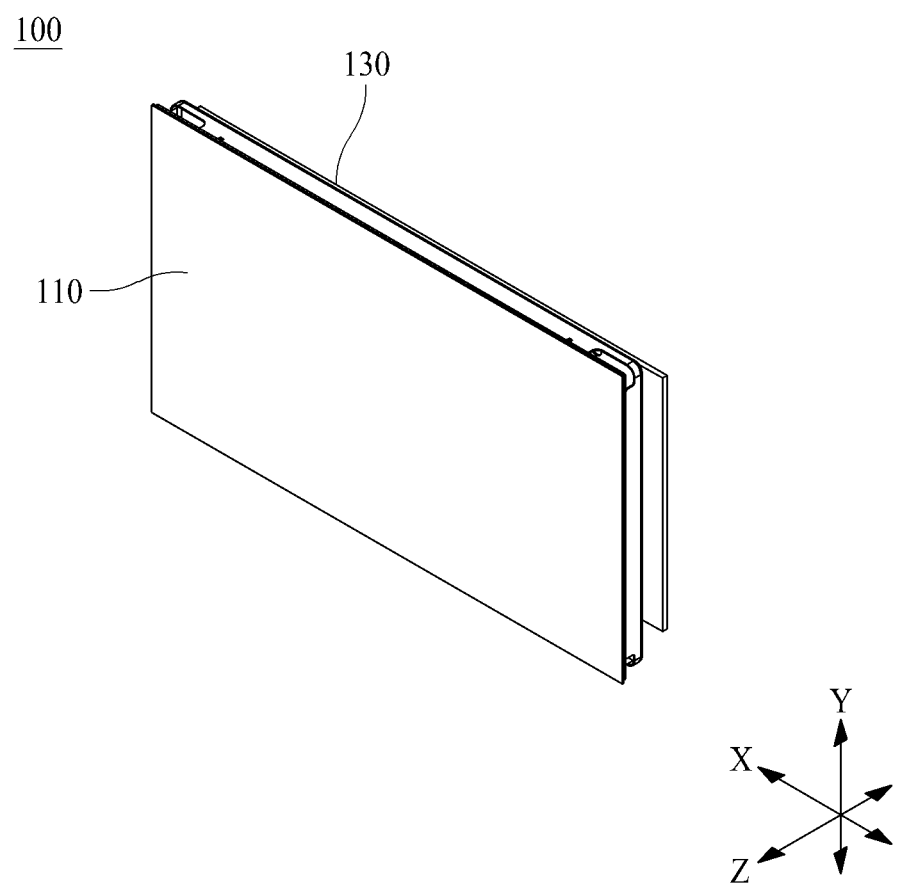
FIG. 1 is a schematic perspective view of a display apparatus according to an aspect of the present disclosure.

Reference will now be made in detail to the aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present disclosure are used, another portion may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it may be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
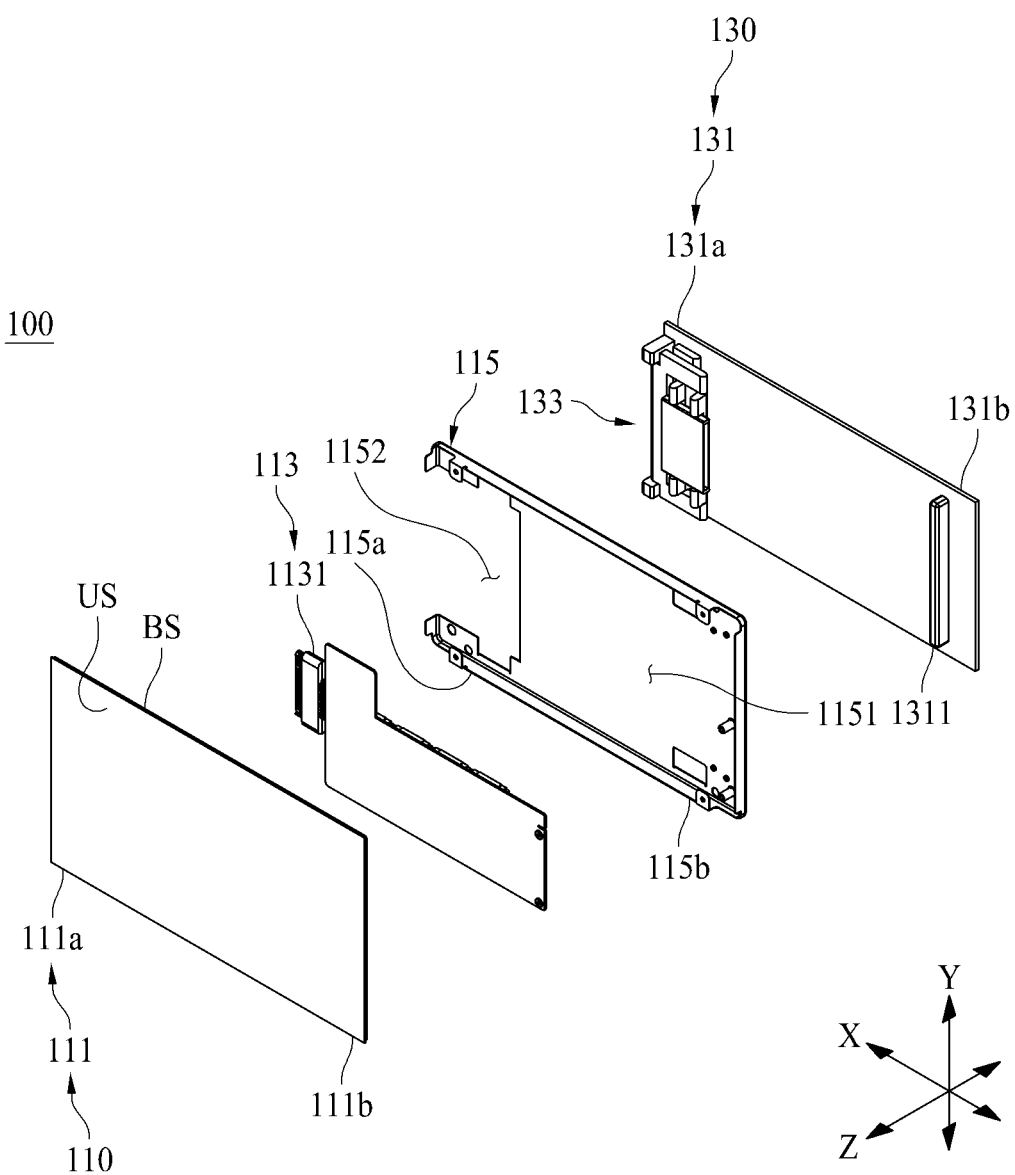
FIG. 2 is a schematic exploded perspective view of a display apparatus according to an aspect of the present disclosure.
Figure 3A:
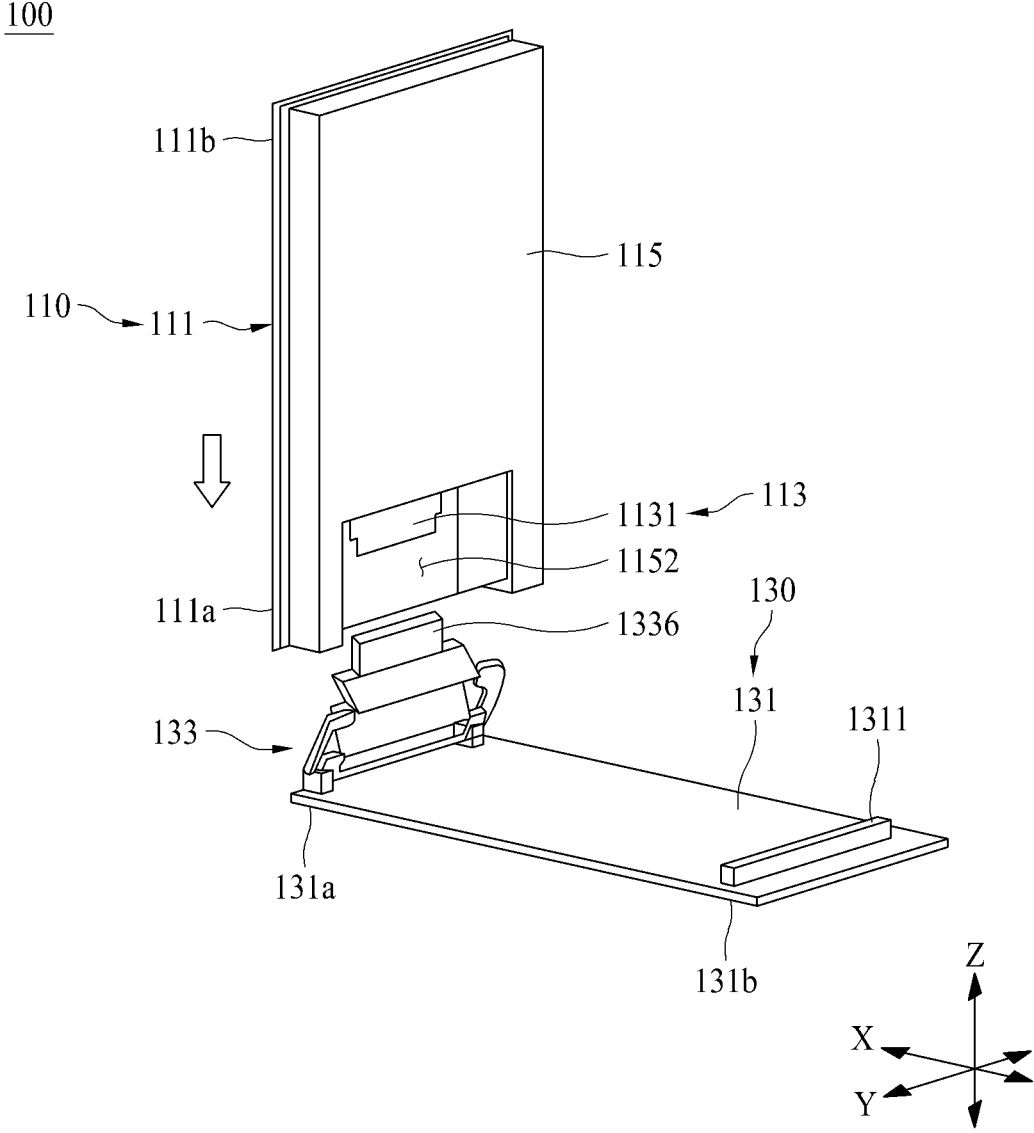
FIG. 3A is a schematic operation state diagram showing that a display module is coupled to a support module in an open position of a display apparatus according to an aspect of the present disclosure.
Figure 3B:
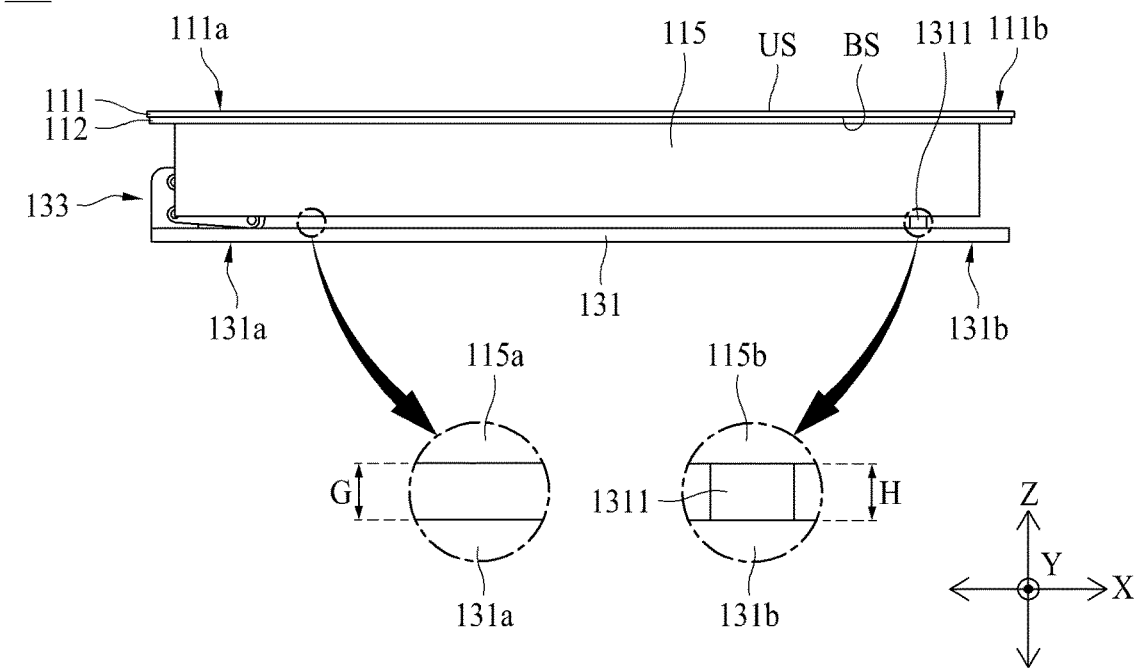
FIG. 3B is a schematic bottom view showing switching from an open position to a closed position of the display apparatus according to an aspect of the present disclosure.
Figure 4:
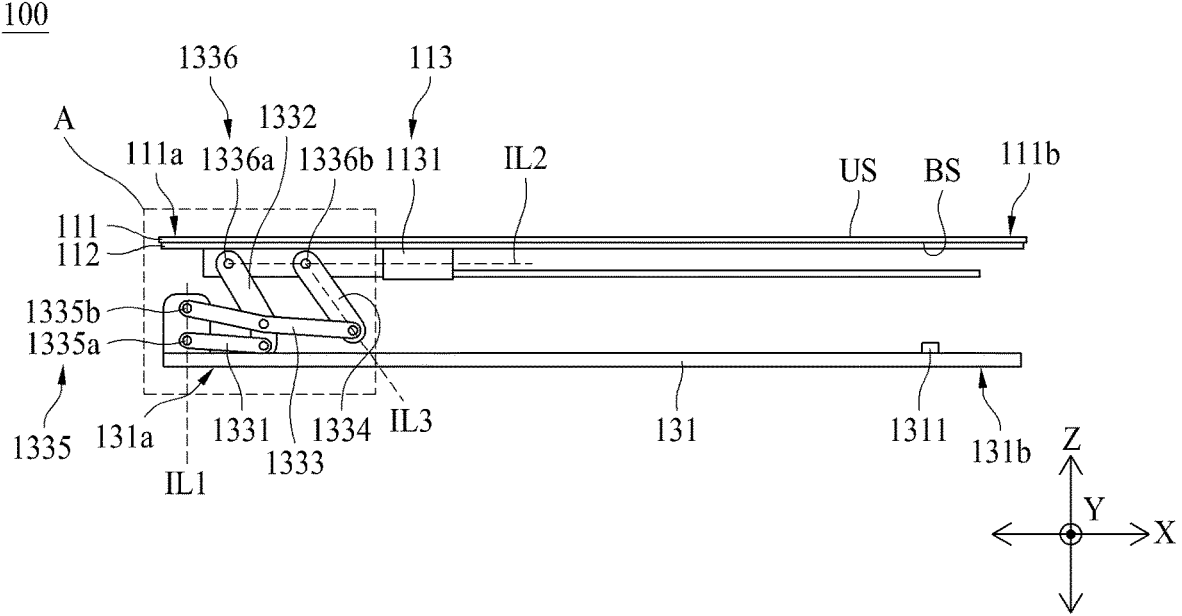
FIG. 4 is a bottom view except for a body to explain a link structure in FIG. 3B.

FIG. 1 is a schematic perspective view of a display apparatus according to an aspect of the present disclosure, FIG. 2 is a schematic exploded perspective view of a display apparatus according to an aspect of the present disclosure, FIG. 3A is a schematic operation state diagram showing that a display module is coupled to a support module in an open position of a display apparatus according to an aspect of the present disclosure, FIG. 3B is a schematic bottom view showing switching from an open position to a closed position of the display apparatus according to an aspect of the present disclosure, and FIG. 4 is a bottom view except for a body to explain a link structure in FIG. 3B.

Referring to FIGS. 1 to 4, a display apparatus 100 according to an aspect of the present disclosure includes a display module 110 and a support module 130 supporting the display module 110. The support module 130 includes a fixed frame 131 and a link structure 133.

The display module 110 is for outputting an image, and may be provided in a size larger than that of the support module 130 disposed on the rear surface of the display module 110. Accordingly, a user positioned in front of the display module 110 from which an image is output cannot recognize the support module 130 disposed on the rear surface of the display module 110.

The display module 110 may be rotated from the fixed frame 131 through the link structure 133. For example, the display module 110 may be positioned in an open position inclined with respect to the upper surface of the fixed frame 131 by rotating the other side 111b of the display panel 111 in the first rotation direction by the user. Here, the position of the display panel 111 inclined with respect to the upper surface of the fixed frame 131 may include a vertical arrangement of the display panel 111 with respect to the upper surface of the fixed frame 131. Accordingly, as shown in FIG. 3A, the display module 110 may be easily coupled to the support module 130 in the open position.

In a state in which the display module 110 is coupled to the support module 130, the other side 111b of the display panel 111 may be rotated in a second rotation direction opposite to the first rotation direction by the user so as to be positioned in the closed position as shown in FIG. 3B. That is, the display apparatus 100 according to an aspect of the present disclosure may be switched from an open position to a closed position or easily switched from the closed position to the open position through the link structure 133. The display module 110 may include a display panel 111, a circuit plate 113 having a first connector 1131, and a main body 115.

The display panel 111 may be provided in a rectangular shape as a whole. The display panel 111 may be disposed at the front of the display module 110. The display panel 111 may include a front surface (or upper surface) US on which an image is output and a rear surface (or lower surface) BS on which an image is not output. When the display module 110 is coupled to the support module 130, a link structure 133 may be positioned on one side 111a of the display panel 111. As the link structure 133 is positioned on one side 111a of the display panel 111, the other side 111b of the display panel 111 may be rotated around the link structure 133.

A back plate 112 formed of a metal material may be provided on the rear surface BS of the display panel 111. The back plate 112 may be provided to be smaller than the size of the display panel 111. The back plate 112 is for easily rotating the display module 110 from the fixed frame 131.

For example, a plurality of display panels are arranged so that there is almost no gap in order to give the user a sense of unity with an image. In this case, when the display panel is positioned in the closed position, the gap between the plurality of display panels is narrow so that it is difficult to position the display panel to the open position. Accordingly, in the display apparatus 100 according to an aspect of the present disclosure, a user positioned on the front side of the display panel 111 pulls out by a magnetic force the back plate 112 formed of a metal material disposed on the rear surface BS of the display panel 111 using a magnet so that the display module 110 may be rotated in the first rotation direction to easily position the display module 110 to the open position.

The circuit plate 113 may be coupled to the rear surface BS of the display panel 111. The circuit plate 113 is for driving the display panel 111. The circuit plate 113 may include a first connector 1131 for supplying a control signal, power, and the like to the display panel 111. The first connector 1131 may be coupled to or released from the link structure 133. When the first connector 1131 is coupled to the link structure 133, the display module 110 may be coupled to the support module 130. When the first connector 1131 is disconnected from the link structure 133, the display module 110 may be separated from the support module 130. The first connector 1131 may be formed on one side of the circuit plate 113 to be positioned on one side 111a of the display panel 111.

The main body 115 is disposed on the rear surface of the circuit plate 113 and may be coupled to the display panel 111. The main body 115 is for covering the circuit plate 113. As the main body 115 is coupled to the rear surface of the display panel 111, the main body 115 may support the display panel 111. Also, as the main body 115 is coupled to the rear surface of the display panel 111, the circuit plate 113 may be disposed between the display panel 111 and the main body 115. The main body 115 may include a receiving recess 1151 and a coupling recess 1152.

The receiving recess 1151 is for receiving the circuit plate 113. The receiving recess 1151 may be formed inside the main body 115 by providing the main body 115 in the form of a tetrahedron with an empty interior. Most of the circuit plate 113 except for the first connector 1131 may be disposed in the receiving recess 1151. The receiving recess 1151 may be located at the central portion and the other side 115b of the main body 115.

The coupling recess 1152 is for the link structure 133 to be inserted into the body 115 so as to be connected to the first connector 1131. The coupling recess 1152 may be formed by partially removing one side 115a of the main body 115 so that the first connector 1131 is not located in the receiving recess 1151. Here, the removed portion of the body 115 may be the same as or larger than a size of the link structure 133 so that the link structure 133 may be inserted. Accordingly, when the display module 110 is coupled to the support module 130, the main body 115 may not interfere with the link structure 133. Also, even when the display module 110 is rotated based on the link structure 133, the main body 115 may not interfere with the link structure 133.

The coupling recess 1152 may be provided to communicate with the receiving recess 1151. Accordingly, the first connector 1131 may be positioned in the coupling recess 1152, and the circuit plate 113 excluding the first connector 1131 may be positioned in the receiving recess 1151. As the first connector 1131 is positioned in the coupling recess 1152, the display module 110 may be easily coupled to the link structure 133 inserted into the coupling recess 1152.

The fixed frame 131 of the support module 130 may support the display module 110. The fixed frame 131 may be coupled to the first connector 1131 through the link structure 133 so as to support the display module 110. The fixed frame 131 may be coupled to a stand frame 1100 to be described later, thereby being supported by the stand frame 1100 to support the display module 110.

The fixed frame 131 may be formed in a rectangular shape as a whole. The fixed frame 131 may be formed to be the same as or smaller than the display panel 111, and may be formed to have the same size as the main body 115 or be formed to be larger. Accordingly, the main body 115 rotated through the link structure 133 may be caught by the fixed frame 131 and may no longer be rotated. That is, the fixed frame 131 may have a stopper function to prevent rotation of the main body 115. The fixed frame 131 may include a support portion 1311.

The support portion 1311 is for supporting the other side 115b of the main body 115. The support portion 1311 may be disposed on the edge portion of the other side 131b of the fixed frame 131 so as to be spaced apart from the link structure 133 disposed on the edge of the one side 131a of the fixed frame 131. Accordingly, when the display module 110 is coupled to the support module 130 and then positioned in the closed position, the support portion 1311 may be supported on the upper surface of the fixed frame 131 to support the rear surface of the other side 115b of the main body 115.

The support portion 1311 may be formed in a long bar shape along the shorter side length direction of the fixed frame 131 as shown in FIG. 3A, but is not necessarily limited thereto and may be divided into a plurality of portions and spaced apart from each other in the shorter side length direction of the fixed frame 131.

The support portion 1311 may be formed with the same height H as a gap G formed between one side 115a of the main body 115 and one side 131a of the fixed frame 131 in the closed position. Therefore, when the support portion 1311 supports the other side 115b of the main body 115 in the closed position, the front surface US of the display panel 111 and the upper surface of the fixed frame 131 may be arranged in parallel as shown in FIG. 3B. As a result, the support portion 1311 may be formed at a height at which the front surface US of the display panel 111 and the upper surface of the fixed frame 131 are parallel to each other in the closed position. Although not shown, the support portion 1311 may be provided in plurality and is disposed to be spaced apart from each other between one side 115a and the other side 115*b* of the main body 115, that is, along the longer side length direction of the fixed frame 131, thereby improving bearing power with respect to the main body 115. In this case, the plurality of support portions 1311 may be formed to have the same height or different heights within a range in which the front surface US of the display panel 111 and the upper surface of the fixed frame 131 are parallel to each other.

Meanwhile, the support portion 1311 may be formed of a magnetic material. In this case, the body 115 disposed at a position corresponding to the support portion 1311 may be formed of a metal material. The body 115 may be entirely formed of a metal material to facilitate manufacturing. Accordingly, the support portion 1311 and the main body 115 may be magnetically coupled. As a result, in the display apparatus 100 according to the aspect of the present disclosure, when the display module 110 is positioned in the closed position, the display module 110 may be prevented from being switched to the open position by magnetic force formed between the support portion 1311 and the main body 115 without a separate fixing member.

The link structure 133 may be disposed between the fixed frame 131 and the display module 110. More specifically, as shown in FIG. 4, the link structure 133 may be coupled to a first connector 1131 positioned at an edge of one side 131*a* of the fixed frame 131 and an edge of one side 111*a* of the display panel 111, so as to be coupled to the edge portion of one side 131*a* of the fixed frame 131 and the edge portion of one side 111*a* of the display panel 111. Accordingly, the other side 111*b* of the display panel 111 may be rotated based on the edge portion of the one side 111*a* of the display panel 111 to which the link structure 133 is coupled.

The link structure 133 may be provided with at least a six-bar link structure. For example, as shown in FIG. 4, the link structure 133 may be provided in a form in which six link members having different lengths are connected to each other. Accordingly, when an external force is applied to the display panel 111, the other five link members may be organically rotated with respect to the link member fixed to the fixed frame 131.

More specifically, when the edge portion of the other side 111*b* of the display panel 111 is rotated from the rear surface BS in a first rotation direction toward the front surface US of the display panel 111 by an external force, the shape of the link structure may be deformed according to the length and angle of each link member. Accordingly, the display panel 111 may be disposed to be inclined with respect to the fixed frame 131, and the other side 111*b* of the display panel 111 may be disposed more spaced apart from the fixed frame 131 than the one side 111*a*. That is, as shown in FIG. 3A, the other side 111*b* of the display panel 111 and the one side 111*a* of the display panel 111 may be arranged in a line in the third direction (Z-axis direction). Accordingly, in the open position, the display panel 111 may be easily coupled (or attached) to the link structure 133 or may be easily detached (or drawn out) from the link structure 133. The third direction (Z-axis direction) may be a thickness direction of the display panel 111 as shown in FIG. 2. The second direction (Y-axis direction) may be a direction perpendicular to the third direction (Z-axis direction), and may be a shorter side length direction of the display panel 111 as shown in FIG. 2. A first direction (X-axis direction) is a direction perpendicular to each of the second direction (Y-axis direction) and the third direction (Z-axis direction), and may be a length direction of the longer side of the display panel 111 as shown in FIG. 2.

When the edge portion of the other side 111*b* of the display panel 111 is rotated in the second rotation direction from the front surface US to the rear surface BS of the display panel 111 by an external force, the link structure 133 may be restored to the closed position as shown in FIG. 3B. In this case, the one side 111*a* and the other side 111*b* of the display panel 111 may be disposed on the same plane passing through the X axis and the Y axis. Also, in this case, the display panel 111 may be disposed parallel to the fixed frame 131 in the first direction (X-axis direction).

As a result, the link structure 133 may function as a rotation axis of the display module 110 with respect to the fixed frame 131 while connecting the fixed frame 131 and the display module 110.

The display apparatus 100 according to an aspect of the present disclosure is provided so that the display module 110 (or the display panel 111) may rotate with respect to the fixed frame 131 through the link structure 133, and thus, it is possible to easily switch from the closed position to the open position or from the open position to the closed position, and accordingly, the display panel 111 may be easily attached to and detached from the fixed frame 131, thereby shortening a replacement and repair work time or installation work time.

Hereinafter, the link structure 133 of the display apparatus 100 according to an aspect of the present disclosure will be described in detail.

Figure 5A:
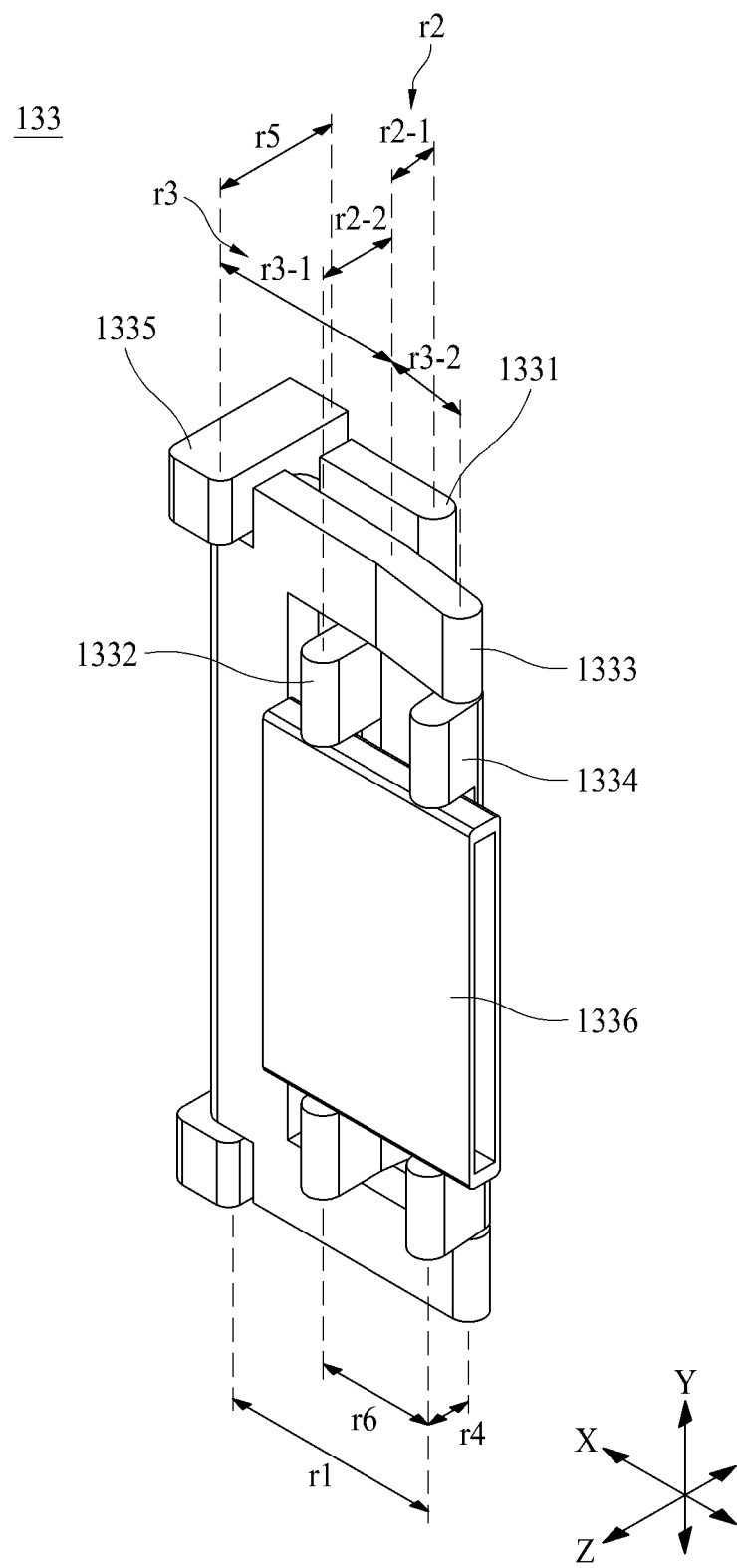
FIG. 5A is a schematic perspective view of a link structure of a display apparatus according to an aspect of the present disclosure.
Figure 5B:
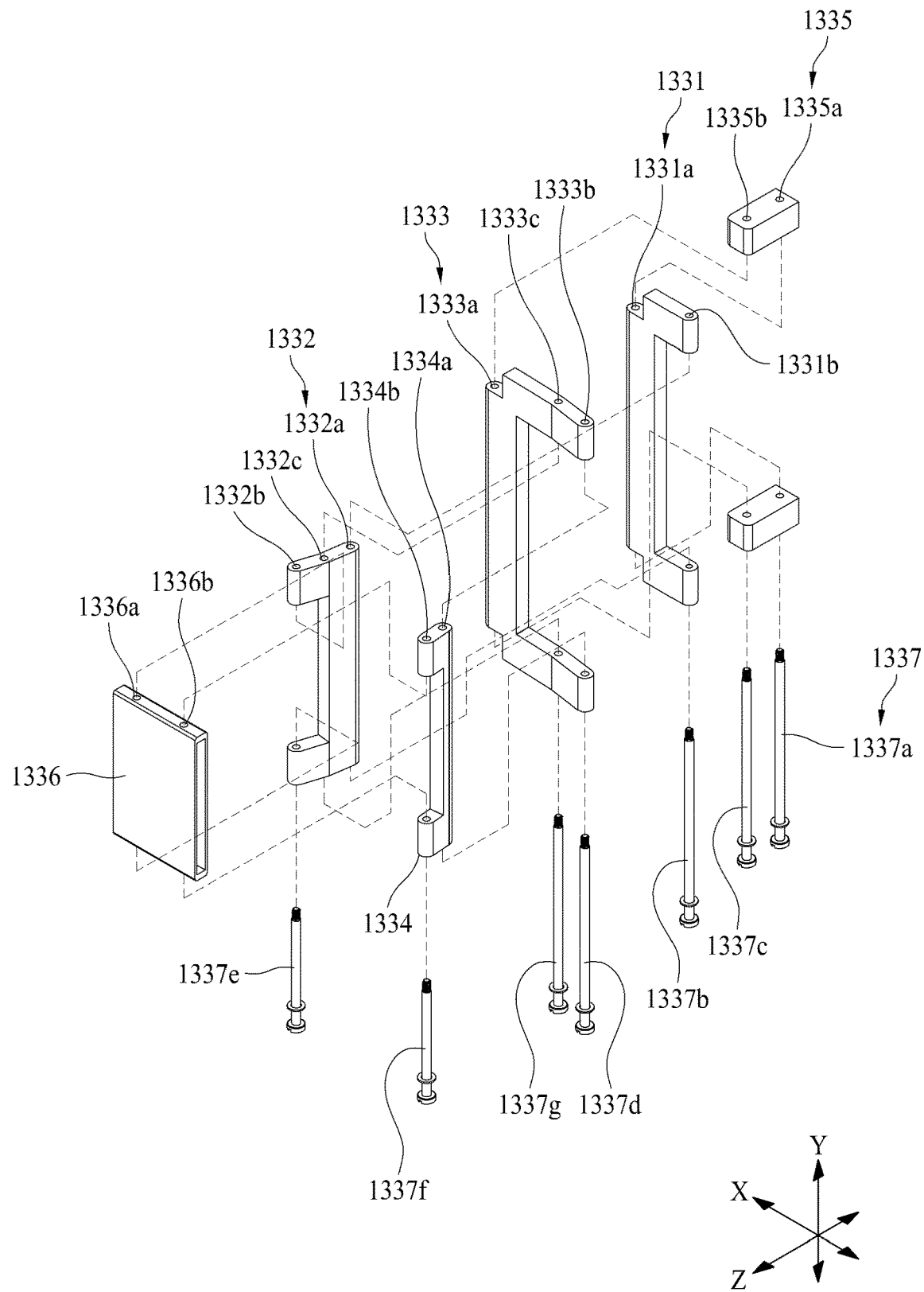
FIG. 5B is a schematic exploded perspective view of a link structure of FIG. 5A.
Figure 6:
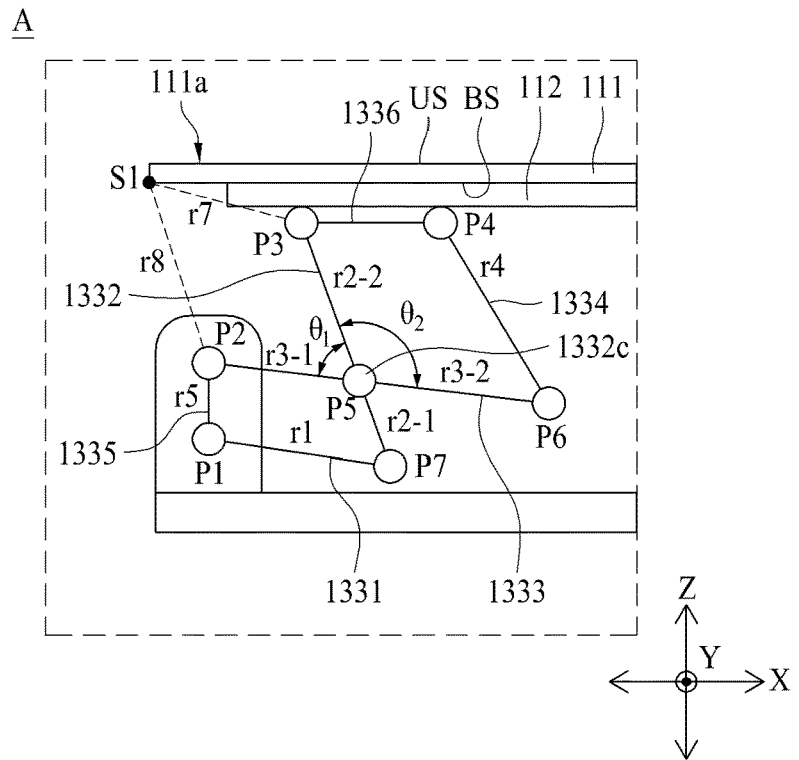
FIG. 6 is a schematic view of portion A of FIG. 4.
Figure 7A:
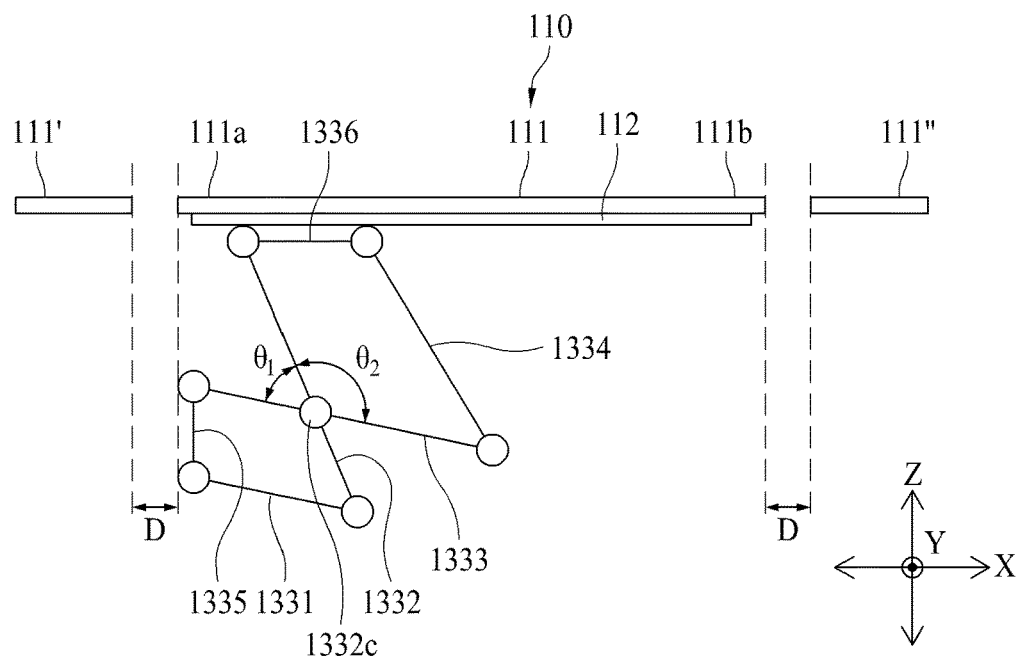
FIG. 7A is a schematic view showing a closed position of a display apparatus according to an aspect of the present disclosure.
Figure 7B:
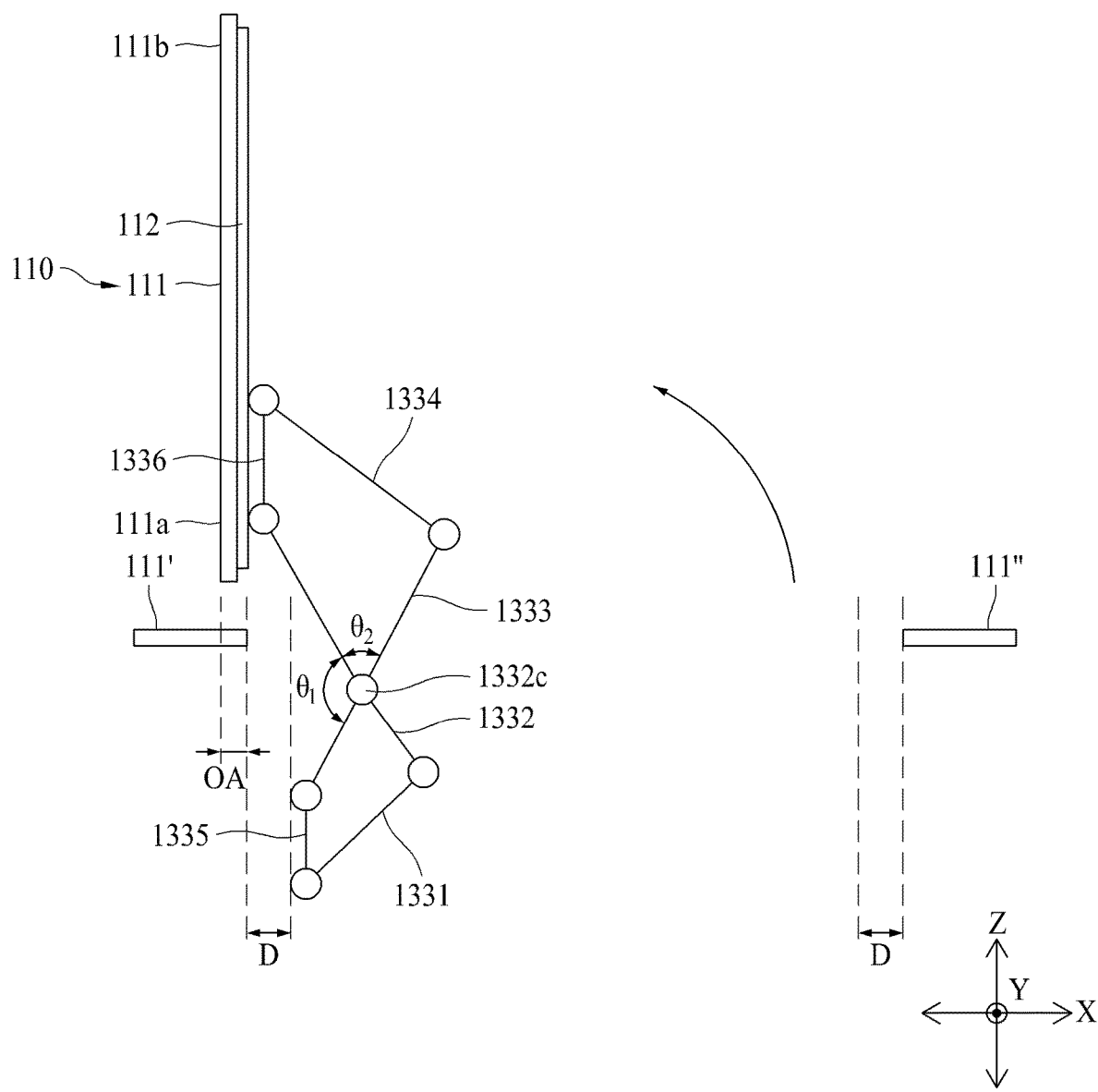
FIG. 7B is a schematic view showing an open position of a display apparatus according to an aspect of the present disclosure.

FIG. 5A is a schematic perspective view of a link structure of a display apparatus according to an aspect of the present disclosure, FIG. 5B is a schematic exploded perspective view of the link structure of FIG. 5A, and FIG. 6 is a schematic view of a portion A of FIG. 4, FIG. 7A is a schematic view showing a closed position of a display apparatus according to an aspect of the present disclosure, and FIG. 7B is a schematic view showing an open position of the display apparatus according to an aspect of the present disclosure.

Referring to FIGS. 1 to 7B, the link structure 133 may include a first link member 1331, a second link member 1332, a third link member 1333, a fourth link member 1334, a fifth link member 1335, a sixth link member 1336, and a connection member 1337.

The first link member 1331 may include a first side 1331*a* and a second side 1331*b*. The first side 1331*a* of the first link member 1331 may be rotatably connected to the fifth link member 1335 coupled to the fixed frame 131. The second side 1331*b* of the first link member 1331 may be rotatably connected to the first side 1332*a* of the second link member 1332. The first side 1331*a* and the second side 1331*b* of the first link member 1331 may be disposed to be spaced apart by a first length r1, and in the present disclosure, the first length r1 is defined as a length of the first link member 1331.

The second link member 1332 includes a first side 1332*a* and a second side 1332*b*, and the first side 1332*a* may be connected to the second side 1331*b* of the first link member 1331. The second side 1332*b* of the second link member 1332 may be rotatably connected to the first side 1336*a* of the sixth link member 1336. The first side 1332*a* and the second side 1332*b* of the second link member 1332 may be disposed to be spaced apart from each other by a second length r2, and in the present disclosure, the second length r2 is defined as a length of the second link member 1332. Here, the second length r2 may not be a straight line distance between the first side 1332*a* and the second side 1332*b* when the second link member 1332 is bent at a predetermined angle as shown in FIG. 4.

Meanwhile, as shown in FIG. 6, the second link member 1332 may intersect the third link member 1333 and intersecting portions may be connected to each other. In the present disclosure, a portion where the second link member 1332 and the third link member 1333 are connected is defined as a connection portion. Accordingly, the second length r2 may be a length obtained by summing a second front length r2-1 from the first side 1332*a* of the second link member 1332 to the connection portion 1332*c* and a second rear length r2-2 from the connection portion 1332*c* to the second side 1332*b* of the second link member 1332. Since the second link member 1332 is connected to the third link member 1333, it may be rotated around the connection portion 1332*c*.

The third link member 1333 may include a first side 1333*a* and a second side 1333*b*. The first side 1333*a* of the third link member 1333 may be rotatably connected to the fifth link member 1335 so as to be positioned above the first side 1331*a* of the first link member 1331. The second side 1333*b* of the third link member 1333 may be rotatably connected to the first side 1334*a* of the fourth link member 1334. The first side 1333*a* and the second side 1333*b* of the third link member 1333 may be disposed to be spaced apart from each other by a third length r3, and in the present disclosure, the third length r3 is defined as a length of the third link member 1333. Here, the third length r3 may not be a straight line distance between the first side 1333*a* and the second side 1333*b* when the third link member 1333 is bent at a predetermined angle as shown in FIG. 4.

Meanwhile, as shown in FIG. 6, the third link member 1333 and the second link member 1332 may intersect each other, and the intersecting portions may be connected to each other. Accordingly, the third length r3 may be a length obtained by summing a third front length r3-1 from the first side 1333*a* of the third link member 1333 to the connection portion 1333*c* (or 1332*c*) and a third rear length r3-2 from the connection portion 1333*c* (or 1332*c*) to the second side 1333*b* of the third link member 1333. Since the third link member 1333 is connected to the second link member 1332, it may be rotated around the connection portion 1333*c*.

The fourth link member 1334 may be connected between the second side 1333*b* of the third link member 1333 and the second side 1336*b* of the sixth link member 1336. More specifically, the fourth link member 1334 may include a first side 1334*a* and a second side 1334*b*, and the first side 1334*a* may be rotatably coupled to is the second side 1333*b* of the third link member 1333, and the second side 1334*b* may be rotatably coupled to the second side 1336*b* of the sixth link member 1336. The first side 1334*a* and the second side 1334*b* of the fourth link member 1334 may be disposed to be spaced apart by a fourth length r4, and in the present disclosure, the fourth length r4 is defined as a length of the fourth link member 1334.

The fifth link member 1335 may include a first side 1335*a* and a second side 1335*b*, the first side 1331*a* of the first link member 1331 may be coupled to on the first side 1335*a*, and the first side 1331*a* of the third link member 1333 may be rotatably coupled to the second side 1335*b*. The first side 1335*a* and the second side 1335*b* of the fifth link member 1335 may be disposed to be spaced apart by a fifth length r5, and in the present disclosure, the fifth length r5 is defined as a length of the fifth link member 1335.

The fifth link member 1335 is fixed to the upper surface of the fixed frame 131, unlike the first to fourth link members 1331, 1332, 1333, and 1334 and the sixth link member 1336. That is, the first side 1335*a* and the second side 1335*b* of the fifth link member 1335 may be fixed to the fixed frame 131. Accordingly, the fifth link member 1335 may be supported by the fixed frame 131 to support the first to fourth link members 1331, 1332, 1333, and 1334 and the sixth link member 1336. When the first connector 1131 of the display module 110 is coupled to the sixth link member 1336, the fifth link member 1335 may support even the display module 110 together. Accordingly, the fifth link member 1335 may be firmly coupled to the fixed frame 131 or may be integrally formed with the fixed frame 131. The fifth link member 1335 may be disposed at an edge portion of one side 131*a* of the fixed frame 131.

The sixth link member 1336 may be connected between the second side 1332*b* of the second link member 1332 and the second side 1334*b* of the fourth link member 1334. More specifically, the sixth link member 1336 may include a first side 1336*a* and a second side 1336*b*, and the first side 1336*a* may be rotatably coupled to the second side 1332*b* of the second link member 1332, and the second side 1336*b* may be rotatably coupled to the second side 1334*b* of the fourth link member 1334. The first side 1336*a* and the second side 1336*b* of the sixth link member 1336 may be disposed to be spaced apart by a sixth length r6, and in the present disclosure, the sixth length r6 is defined as a length of the sixth link member 1336.

Each of the first length r1, second length r2, third length r3, fourth length r4, fifth length r5, and sixth length r6 may refer to lengths of the first link member 1331, the second link member 1332, the third link member 1333, the fourth link member 1334, the fifth link member 1335, and the sixth link member 1336 on a plane passing through the X and Z axes based on FIG. 6, respectively.

Meanwhile, in the display apparatus 100 according to an aspect of the present disclosure, the sixth link member 1336 may be provided as a second connector for driving the display module 110. More specifically, the second connector may be coupled to the first connector 1131 of the display module 110 to receive a control signal, a driving voltage, etc. from a controller or a voltage supply unit and transmit the same to the first connector 1131, to thereby contribute to driving of the display module 110.

Since the display apparatus 100 according to an aspect of the present disclosure includes the sixth link member 1336 as the second connector, there is no need for a separate connector for driving the display module 110, thereby reducing an overall thickness.

In addition, since the display apparatus 100 according to an aspect of the present disclosure includes the sixth link member 1336 as the second connector, the first connector 1131 of the display module 110 and the second connector of the support module 130 may be easily coupled by an operation of positioning a coupling position of the second connector in the open position to the second direction (Y axis direction) as shown in FIG. 3A and sliding the display module 110, so that an installation work time may be shortened compared to a case in which the user connects the connector manually.

In addition, in the display apparatus 100 according to an aspect of the present disclosure, the first connector 1131 may be easily separated from the second connector by making a sliding direction of the display module 110 a reverse direction of the installation work in an operation of releasing the display module 110 from the support module 130, and thus, a disassembly time may also be shortened.

As a result, in the display apparatus 100 according to an aspect of the present disclosure, an attachment/detachment time of the display module 110 to the fixed frame 131 and a coupling time of the first connector and the second connector may be reduced through the link structure 133 including the second connector.

Referring back to FIG. 5B, the connection member 1337 serves to rotatably couple the first link member 1331, the second link member 1332, the third link member 1333, the fourth link member 1334, and the sixth link member 1336 to the first link member 1335. The connection member 1337 may include a first connection member 1337a, a second connection member 1337b, a third connection member 1337c, a fourth connection member 1337d, a fifth connection member 1337e, a sixth connection member 1337f, and a seventh connection member 1337g.

The first connection member 1337a may rotatably connect the first side 1331a of the first link member 1331 and the first side 1335a of the fifth link member 1335.

The second connection member 1337b may rotatably connect the second side 1331b of the first link member 1331 and the first side 1332a of the second link member 1332 to each other.

The third connection member 1337c may rotatably connect the first side 1333a of the third link member 1333 and the second side 1335b of the fifth link member 1335.

The fourth connection member 1337d may rotatably connect the second side 1333b of the third link member 1333 and the first side 1334a of the fourth link member 1334.

The fifth connection member 1337e may rotatably connect the second side 1332b of the second link member 1332 and the first side 1336a of the sixth link member 1336.

The sixth connection member 1337f may rotatably connect the second side 1334b of the fourth link member 1334 and the second side 1336a of the sixth link member 1336.

The seventh connection member 1337g may rotatably connect the connection portion 1333c of the third link member 1333 and the connection portion 1332c of the second link member 1332.

Meanwhile, the length of the fifth connection member 1337e and the sixth connection member 1337f may be shorter than the length of the first to fourth connection members 1337a, 1337b, 1337c, and 1337d and the seventh connection member 1337g. This is because the first connector of the display module 110 should be inserted into the sixth link member 1336, that is, the second connector. Also, although not shown, to connect the sixth link member 1336 to each of the second side 1332b of the second link member 1332 and the second side 1334b of the fourth link member 1334, the fifth connection member 1337e and the sixth connection member 1337f may be provided as a pair.

Referring to FIGS. 5A and 5B, the first side 1333a of the third link member 1333 and the first side 1331a of the first link member 1331 may be located inside (or on an inner surface) of the fifth link member 1335, the second link member 1332 and the fourth link member 1334 may be located inside (or on an inner surface) of the third link member 1333, the second side 1332b of the second link member 1332 may be located inside (or on an inner surface) of the second side 1331b of the first link member 1331, and the sixth link member 1336 may be located inside (or on an inner surface) of each of the second side 1332b of the second link member 1332 and the second side 1334b of the fourth link member 1334. Accordingly, when an external force is applied to the display module 110, each of the first to fourth link members 1331, 1332, 1333, and 1334 and the sixth link member 1336 may not interfere with each other and may be rotated based on the fifth link member 1331.

Meanwhile, in the display apparatus 100 according to an aspect of the present disclosure, rotation of the first to fourth link members 1331, 1332, 1333, and 1334 and the sixth link member 1336 rotated based on the fifth link member 1335 may be limited by changing a thickness or length of each of the first to fourth link members 1331, 1332, 1333, and 1334 and the sixth link member, excluding the fifth link member 1335.

For example, the second link member 1332 disposed near the connection portion 1332c of the second link member 1332 may be formed to be thicker than the first side 1332a or the second side 1332b so as not to interfere with the first display panel 111' adjacent to one side 111a of the display panel 111 in the open position as shown in FIG. 7B. Accordingly, when switching is performed from the closed position to the open position, the third link member 1333 comes into contact with the thickened portion of the second link member 1332, so that the display panel 111 may not move further toward the adjacent first display panel 111' or may not be in contact with an upper surface of the first display panel 111'. Here, the first display panel 111' may refer to a display panel of the first display module adjacent to one side 111a of the display panel 111 in the closed position.

In the above example, the second link member 1332 near the connection portion 1332c is described as being thick, but the thickness of the third link member 1333 near the connection portion 1333c may be formed to be greater than the first side 1333a or the second side 1333b to limit the rotation of the display module 110. Alternatively, without adjusting the thickness of at least one of the first link member 1331, the fourth link member 1334, and the sixth link member 1336 or adjusting the thickness of the first to fourth link members 1331, 1332, 1333, and 1334 and the sixth link member 1336, a stop member (not shown) for limiting the rotation of the third link member 1333 in the second direction (Y-axis direction) may be provided near the second side 1335 of the fifth link member 1335, thereby limiting rotation of the display module 110.

As a result, in the display apparatus 100 according to an aspect of the present disclosure, by limiting the rotation of the link structure 133, interference (or contact) of the display module 110 to the adjacent display panel may be prevented, thereby preventing damage to the display module 110 during installation work and disassembly work.

Meanwhile, in the display apparatus 100 according to an aspect of the present disclosure, the first length r1 may be greater than the third front length r3-1 and smaller than the second length r2, r4 may be greater than the second rear length r2-2, and the fifth length r5 may be smaller than the sixth length r6.

Also, as shown in FIG. 6, when a connection portion where the first link member 1331 and the fifth link member 1335 are connected is P1, a connection portion where the third link member 1333 and the fifth link member 1335 is P2, a connection portion where the second link member 1332 and the sixth link member 1336 are connected is P3, a connection portion where the fourth link member 1334 and the sixth link member 1336 are connected is P4, a connection portion where the second link member 1332 and the third link member 1333 are connected is P5, a connection portion where the third link member 1333 and the fourth link member 1334 are connected is P6, a length of a first extending imaginary line from P3 to an end S1 of the lower surface BS of the display panel 111 is a seventh length r7, and a length of a second extending imaginary line from the end S1 of the lower surface BS of the display panel 111 to P2 is an eighth length r8, the seventh length r7 may be smaller than the eighth length r8.

In addition, when an angle of the second link member 1332 positioned on the left with respect to P5 and the third link member 1333 positioned on the upper side with respect to P5 is a first angle θ1 and an angle of the second link member 1332 positioned on the right with respect to P5 and the third link member 1333 positioned on the upper side with respect to P5 is a second angle θ2, the first angle θ1 may be smaller than the second angle θ2.

As a result, the display apparatus 100 according to an aspect of the present disclosure may be provided to satisfy conditions such as r3-1<r1<r2, r4>r2-2, r5<r6, r7<r8, and θ1<θ2 in the closed position.

The reason why the length of each of the first to sixth link members 1331, 1332, 1333, 1334, 1335, and 1336, the length of the first and second extending imaginary lines, the first angle θ1, and the second angle θ2 should satisfy the above conditions is because the display panel 111 does not interfere with the adjacent first display panel 111' (in FIG. 7A) and the second display panel 111" (in FIG. 7A) when switching is performed from the closed position to the open position or from the open position to the closed position only when the above conditions are met in the structure in which the first side 1331a of the first link member 1331 and the first side 1333a of the third link member 1333 are fixed, that is, in a double locker structure. Here, the second display panel 111" may refer to a display panel of the second display module adjacent to the other side 111b of the display panel 111 in the closed position.

If the conditions such as r3-1<r1<r2, r4>r2-2, r5<r6, r7<r8, and θ1<θ2 are not satisfied in the closed position, the display panel 111 to be replaced, repaired or installed collides at least one of the adjacent first and second display panels 111' and 111", and thus, the display panel may be damaged. Alternatively, if the above equation is not satisfied, the display panel 111 may interfere with the first display panel 111' or the second display panel 111" and thus cannot be switched to the open position.

As a result, in the display apparatus 100 according to an aspect of the present disclosure, since the link structure 133 is provided to satisfy the conditions r3-1<r1<r2, r4>r2-2, r5<r6, r7<r8, and θ1<θ2 in the closed position, the display module 110 is easily attached to the link structure 133 without interfering with the adjacent first and second display panels 111' and 111".

As described above, since the first to sixth link members 1331, 1332, 1333, 1334, 1335, and 1336 are provided to satisfy the conditions r3-1<r1<r2, r4>r2-2, r5<r6, r7<r8, and θ1<θ2 in the closed position and the position of the display panel 111 connected to the link structure 133 is positioned, there are structural features as shown in FIG. 4 that the first side 1335a and the second side 1335b of the fifth link member 1335 are positioned on the first imaginary line IL1 corresponding to the thickness direction of the display panel 111, the first side 1336a and the second side 1336b of the sixth link member 1336 are positioned on the second imaginary line IL2 corresponding to the length direction of the display panel 111, the first side and the second side of each of the first link member 1331, the second link member 1332, the third link member 1333, and the fourth link member 1334 are positioned on the third imaginary line IL3 corresponding to a diagonal direction between the thickness direction and the length direction of the display panel 111. Here, matching may include not only completely matching but also roughly matching.

FIGS. 7A and 7B are schematic operating state diagram showing that the display panel 111 disposed between adjacent display panels 111' and 111" is switched from the closed position to the open position when a plurality of display apparatuses 100 according to an aspect of the present disclosure are installed.

FIG. 7A shows a case where the display panel 111 is positioned in the closed position, in which the plurality of display panels 111', 111, 111" may be arranged to have an non-interference interval D in a first direction (X axis direction) on a plane passing through the X-axis and the Y-axis. For example, the non-interference interval D may be approximately 64 μm, but is not necessarily limited thereto. The link structure 133 may be a six-bar link having a double locker structure satisfying the conditions of r3-1<r1<r2, r4>r2-2, r5<r6, r7<r8, and θ1<θ2 in the closed position. As shown in FIG. 7A, in the closed position, the upper surfaces of each of the plurality of display panels 111', 111, and 111" may be arranged to be parallel to each other in the first direction (X-axis direction).

FIG. 7B shows a state in which the display panel 111 is switched to the open position by an external force. As the other side 111b of the display panel 111 is opened upward in the third direction (Z-axis direction), the second link member 1332 (or the second side of the second link member 1332) connected to the one side 111a of the display panel 111 and the fourth link member 1334 (or the second side of the fourth link member 1334) may be moved by a predetermined distance in the leftward and upward directions than in FIG. 7A. Accordingly, the third link member 1333 (or the second side of the third link member 1333) connected to the second link member 1332 and the fourth link member 1334 and the first link member 1331 (or the second side of the first link member 1331) connected to the second link member 1332 may be moved by a predetermined distance in the leftward and upward directions. Accordingly, as shown in FIG. 7B, the first angle θ1 may be greater than the second angle θ2.

The display panel 111 may be moved according to movement of the six-bar link having a double locker structure satisfying the conditions such as r3-1<r1<r2, r4>r2-2, r5<r6, r7<r8, and θ1<θ2 in the closed position. Accordingly, the other side 111b of the display panel 111 may be disposed to overlap OA with the first display panel 111' as shown in FIG. 7B, without interfering with the second display panel 111".

Similarly, since one side 111a of the display panel 111 is moved according to the movement of the six-bar link of the double locker structure that satisfies the above equation, the display panel 111 may overlap OA with the display panel 111' as shown in FIG. 7B, without interfering with the first display panel 111'. Here, the overlapping of the one side 111a and the other side 111b of the display panel 111 with the first display panel 111' may mean that the display panel 111 overlaps in the third direction (Z axis direction), that is, the thickness of the first display module 111'. Accordingly, in the closed position as shown in FIG. 7A, the display panel 111 may not overlap with the first display panel 111' and the second display panel 111".

As a result, in the display apparatus 100 according to an aspect of the present disclosure, since the display panel 111 is provided to be moved according to movement of the link structure having a double locker structure satisfying the conditions such as r3-1<r1<r2, r4>r2-2, r5<r6, r7<r8, and θ1<θ2 in the closed position, the display panel 111 may be switched from the closed position to the open position, without interfering with the first and second display panels 111' and 111" arranged at the non-interference interval D.

In the display apparatus 100 according to an aspect of the present disclosure, since the display panel 111 is moved (or rotated θ through the link structure 133 satisfying the above conditions in the closed position, the display panel 111 may be positioned above the upper surface of the first display panel 111' over the non-interference interval D in the open position as shown in FIG. 7B.

Therefore, in the display apparatus 100 according to an aspect of the present disclosure, the first connector of the display module 110 may be easily coupled to or separated from the second connector of the support module 130 in the open position, an installation, repair, or replacement work time for the display module 110 may be reduced.

Figure 8:
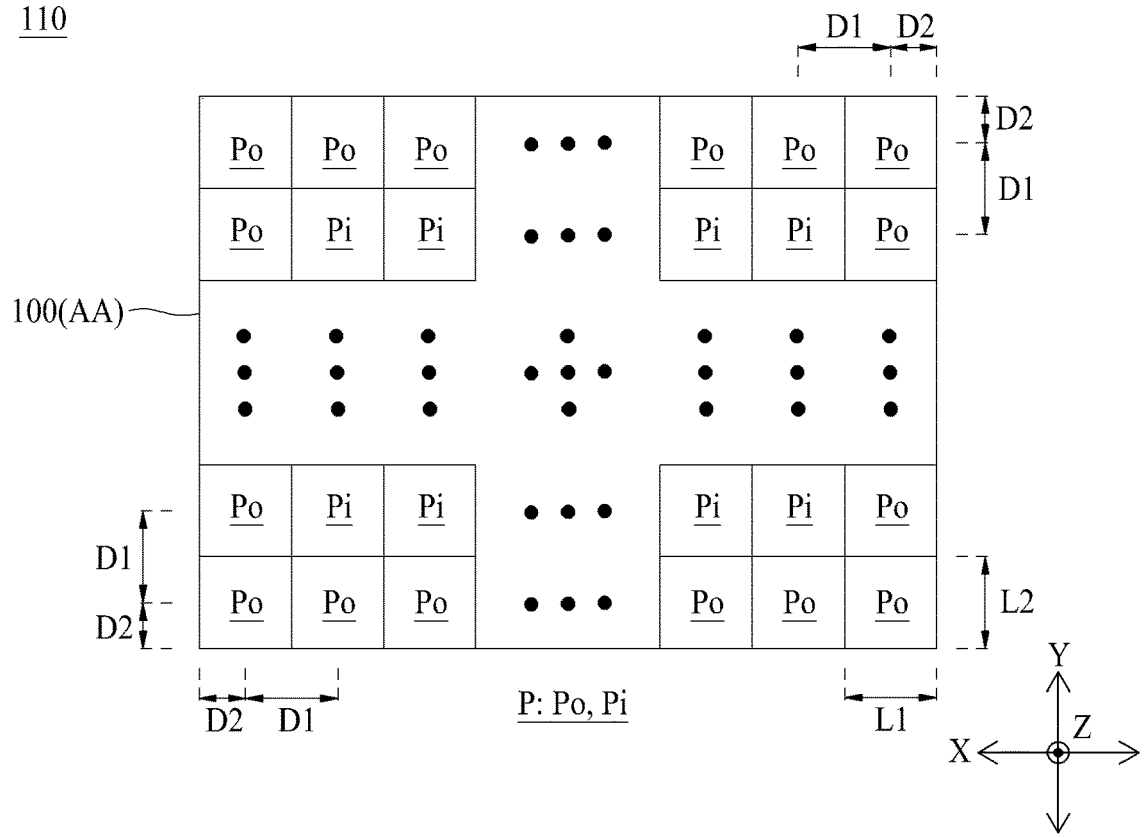
FIG. 8 is a schematic front view of a display apparatus according to an aspect of the present disclosure.
Figure 9:
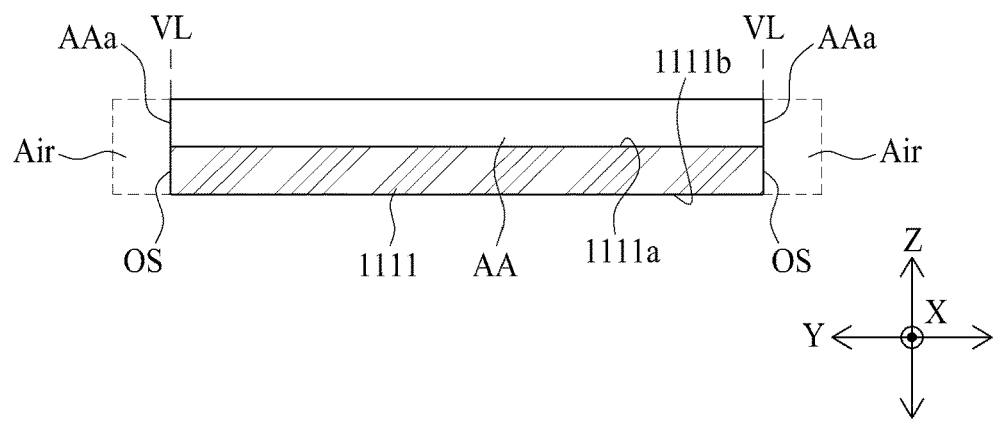
FIG. 9 is a schematic side view of a display apparatus according to an aspect of the present disclosure.
Figure 10A:
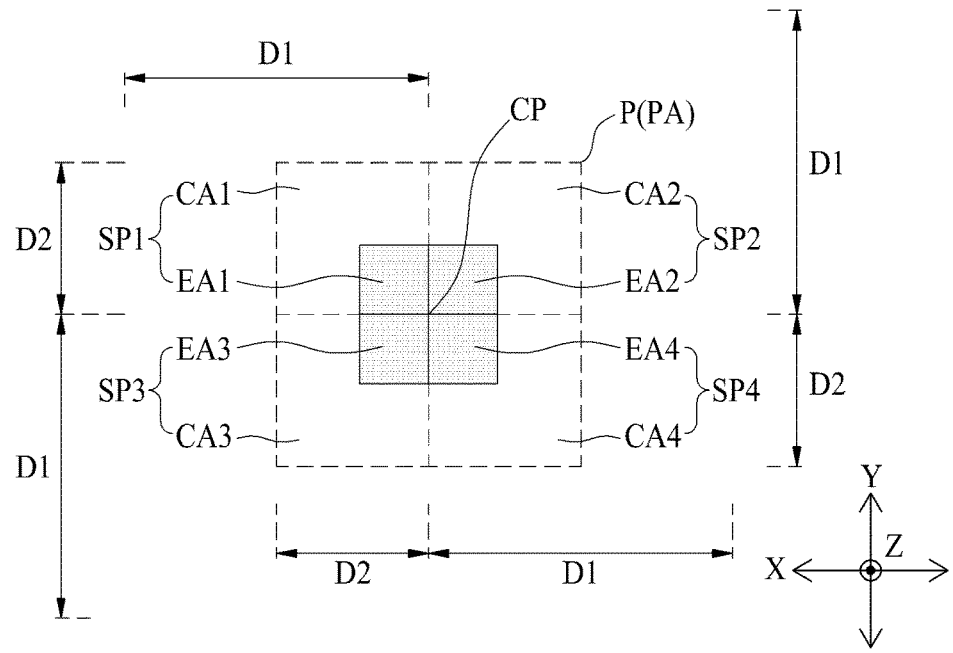
FIG. 10A is a diagram illustrating one pixel according to an example illustrated in FIG. 8.
Figure 10B:
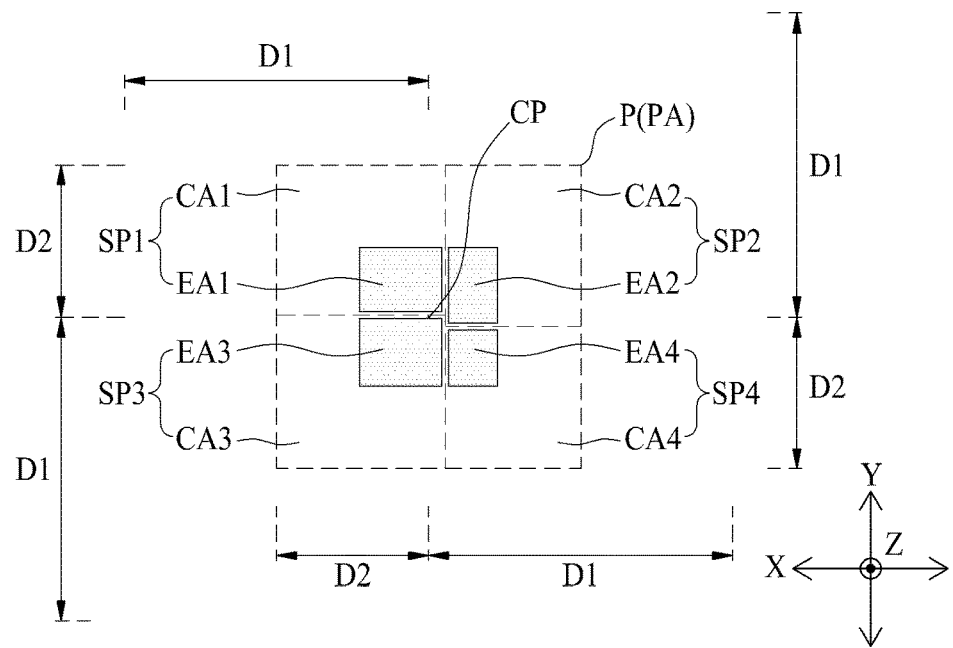
FIG. 10B is a diagram illustrating one pixel according to another example illustrated in FIG. 8.

FIG. 8 is a schematic front view of a display apparatus according to an aspect of the present disclosure, FIG. 9 is a schematic side view of a display apparatus according to an aspect of the present disclosure, FIG. 10A is a diagram illustrating one pixel according to an example illustrated in FIG. 8, and FIG. 10B is a diagram illustrating one pixel according to another example illustrated in FIG. 8.

Referring to FIGS. 8 and 9, in the display apparatus 100 according to an aspect of the present disclosure, the display panel 110 may include a substrate 1111 having a display portion AA, a substrate 1111, and a plurality of pixels P formed on the display portion AA of the substrate 1111.

The substrate 1111 may be expressed as a first substrate, a base substrate, or a pixel array substrate. For example, the substrate 1111 may be a glass substrate, a bendable thin glass substrate, or a plastic substrate.

The substrate 1111 according to an example may include a first surface 1111a, a second surface 1111b, and an outer surface OS. The first surface 1111a of the substrate 1111 may be defined as a front surface, an upper surface, or an upper side surface facing the front of the display apparatus. Here, the first surface 1111a of the substrate 1111 may be the front surface US of the display panel 110. The second surface 1111b of the substrate 1111 may be defined as a back surface, a rear surface, a lower surface, or a lower side surface facing the rear of the display apparatus. Here, the second surface 1111b of the substrate 1111 may be the rear surface BS of the display panel 110. The outer surface OS of the substrate 1111 may be defined as a side, a side surface, or a side wall exposed to the air while facing a lateral surface of the display apparatus.

The display portion AA may be expressed an area where an image is displayed and may be expressed as an active portion, an active region, or a display region. A size of the display portion AA may be the same as the size of the substrate (or display apparatus) 1111. For example, the size of the display portion AA may be the same as the overall size of the first surface 1111a of the substrate 1111. Accordingly, the display portion AA is implemented (or disposed) on the entire front surface of the substrate 1111 so that the substrate 1111 does not include a non-display region is provided along the edge of the first surface 1111a to surround the entire display portion AA. Accordingly, the entire front surface of the display apparatus may implement the display portion AA.

The end (or outermost) AAa of the display portion AA may overlap an outer surface OS of the substrate 1111 or may be aligned with the outer surface OS of the substrate 1111. For example, based on the thickness direction (third direction (Z-axis direction)) of the display apparatus, the lateral surface AAa of the display portion AA may be aligned with an extended vertical extension line VL perpendicular to the outer surface OS of the substrate 1111. The lateral surface AAa of the display portion AA may be surrounded only by air without being surrounded by a separate mechanism. That is, all of the lateral surfaces AAa of the display portion AA may have a structure in direct contact with air without being surrounded by a separate mechanism. Accordingly, since the outer surface OS of the substrate 1111 corresponding to the end AAa of the display portion AA is surrounded only by air, the display apparatus 100 according to the aspect of the present disclosure may have an air-bezel structure in which the end AAa of the display portion AA is surrounded by air instead of an opaque non-display region or a structure without a bezel.

The plurality of pixels P may be arranged (or disposed) to have a first interval D1 on the display portion AA of the substrate 1111 in each of the first direction (X-axis direction) and the second direction (Y-axis direction). The first direction (X-axis direction) may be a horizontal direction, or a first longitudinal direction (e.g., a horizontal longitudinal direction) of the substrate 1111 or the display apparatus. The second direction (Y-axis direction) may be a vertical direction or may be a second longitudinal direction (e.g., a vertical longitudinal direction) of the substrate 1111 or the display apparatus.

Each of the plurality of pixels P may be implemented on a plurality of pixel regions defined on the display portion AA of the substrate 1111. Each of the plurality of pixel regions may have a first length L1 parallel to the first direction (X-axis direction) and a second length L2 parallel to the second direction (Y-axis direction). The first length L1 may be equal to the second length L2 or may be equal to the first interval D1. Each of the first length L1 and the second length L2 may be equal to the first interval D1. Accordingly, the plurality of pixels P may all have the same size. For example, the first length L1 may be expressed as a first width, a horizontal length, or a horizontal width. The second length L2 may be expressed as a second width, a vertical length, or a vertical width.

Two pixels P adjacent in each of the first direction (X-axis direction) and the second direction (Y-axis direction) may have the same first interval D1 within an error range in the manufacturing process. The first interval D1 may be a pitch (or pixel pitch) between two adjacent pixels P. For example, the first distance D1 may be the shortest distance (or the shortest length) between the centers of each of the two adjacent pixels P. Optionally, the pixel pitch may be a size between one end and the other end of the pixel P parallel to the first direction (X-axis direction). Also, in another example, the pixel pitch may be expressed as a size between one end and the other end of the pixel P parallel to the second direction (Y-axis direction).

Each of the plurality of pixels P may include a circuit layer including a pixel circuit implemented in a pixel region on the substrate 1111 and a light emitting device layer disposed on the circuit layer and connected to the pixel circuit. The pixel circuit outputs a data current corresponding to a data signal in response to a data signal and a scan signal supplied from pixel driving lines disposed in the pixel region. The light emitting device layer may include a light emitting layer that emits light by the data current supplied from the pixel circuit.

The plurality of pixels P may be divided into outermost pixels Po and internal pixels Pi.

The outermost pixels Po (or the first pixels) may be pixels disposed closest to the outer surface OS of the substrate 1111 among the plurality of pixels P. For example, the outermost pixels Po may be expressed as first pixels.

The second distance D2 between the center of the outermost pixels Po and the outer surface OS of the substrate 1111 may be half or less than half the first distance D1. For example, the second distance D2 may be the shortest distance (or the shortest length) between the center of the outermost pixels Po and the outer surface OS of the substrate 1111.

When the second interval D2 exceeds half of the first interval D1, the substrate 1111 have a larger size than the display portion AA by a difference between the half of the first interval D1 and the second interval D2, and therefore, the region between the end of the outermost pixel Po and the outer surface OS of the substrate 1111 may be configured as a non-display region surrounding the entire display portion AA. For example, when the second interval D2 exceeds half of the first interval D1, the substrate 1111 inevitably includes a bezel region according to the non-display region surrounding the entire display region AA. Therefore, when the plurality of display panels 110 are disposed adjacent to each other, the sum of the second intervals D2 of each of the two substrates 1111 is greater than the first interval D1, so that the sum of the second interval D2 of each of the two substrates 1111 is greater than the sum (or seam) of the bezel region of each substrate 1111 and may be recognized by the user.

Meanwhile, when the second interval D2 is half or less than half the first interval D1, the end of the outermost pixel Po may be aligned with the outer surface OS of the substrate 1111 or the end AAa of the display portion AA may be aligned with the outer surface OS of the substrate 1111, and thus the display portion AA may be implemented (or disposed) on the entire surface of the substrate 1111. Accordingly, even if a plurality of display panels 110 according to an aspect of the present disclosure are disposed adjacently, a seam may not be recognized by a user.

The internal pixels Pi may be pixels other than the outermost pixels Po among the plurality of pixels P or pixels surrounded by the outermost pixels Po among the plurality of pixels P. The internal pixels Pi may be represented by second pixels. These internal pixels Pi may be implemented in a configuration or structure different from that of the outermost pixel Po.

Referring to FIGS. 8 and 10A, one pixel P according to an aspect of the present disclosure may include first to fourth sub-pixels SP1, SP2, SP3, and SP4 disposed in the pixel region PA.

The first sub-pixel SP1 may be disposed in a first sub-pixel region of the pixel region PA, the second sub-pixel SP2 may be disposed in a second sub-pixel region of the pixel region PA, the third subpixel SP3 may be disposed in a third subpixel region of the pixel region PA, and the fourth subpixel SP4 may be disposed in a fourth subpixel region of the pixel region PA.

As an example, the first subpixel SP1 may be implemented to emit light of a first color, the second subpixel SP2 may be implemented to emit light of a second color, the third subpixel SP3 may be implemented to emit light of a third color, and the fourth sub-pixel SP4 may be implemented to emit light of the fourth color. Each of the first to fourth colors may be different. For example, the first color may be red, the second color may be blue, the third color may be white, and the fourth color may be green.

As another example, some of the first to fourth colors may be the same. For example, the first color may be red, the second color may be first green, the third color may be second green, and the fourth color may be blue.

Each of the first to fourth sub-pixels SP1, SP2, SP3, and SP4 may include light emitting region EA1, EA2, EA3, and EA4 and circuit regions CA1, CA2, CA3, and CA4.

The light emitting regions EA1, EA2, EA3, and EA4 may be disposed to be shifted toward the center CP of the pixel P in the sub-pixel region. For example, the light emitting regions EA1, EA2, EA3, and EA4 may be expressed as an opening region, an opening, or a light emitting portion.

According to an example, the light emitting regions EA1, EA2, EA3, and EA4 of each of the first to fourth sub-pixels SP1, SP2, SP3, and SP4 may have the same size. For example, each of the light emitting regions EA1, EA2, EA3, and EA4 of the first to fourth subpixels SP1, SP2, SP3, and SP4 may have a uniform quad structure or a uniform stripe structure. For example, the light emitting regions EA1, EA2, EA3, and EA4 having a uniform quad structure or a uniform stripe structure may have a size smaller than a quadrant size of the pixel P and may be disposed to be shifted toward CP in the sub-pixel region or may be disposed to be concentrated in the central portion CP of the pixel P.

Referring to FIGS. 8 and 10B, the light emitting regions EA1, EA2, EA3, and EA4 of each of the first to fourth subpixels SP1, SP2, SP3, and SP4 according to another example may have different sizes. For example, each of the light emitting regions EA1, EA2, EA3, and EA4 of the first to fourth subpixels SP1, SP2, SP3, and SP4 may have a non-uniform quad structure or a non-uniform stripe structure.

The size of each of the first to fourth sub-pixels SP1, SP2, SP3, and SP4 having a non-uniform quad structure (or a non-uniform stripe structure) may be set according to resolution, luminous efficiency, or image quality. As an example, when the light emitting regions EA1, EA2, EA3, and EA4 have an unequal quad structure (or unequal stripe structure), the light emitting region EA4 of the fourth subpixel SP4, among the light emitting regions EA1, EA2, EA3, and EA4 of each of the first to fourth subpixels SP1, SP2, SP3, and SP4 may have the smallest size, and the light emitting region EA3 of the third subpixel SP3 may have the largest size. For example, the light emitting regions EA1, EA2, EA3, and EA4 having a non-uniform quad structure (or a non-uniform stripe structure) may be concentrated around the central portion CP of one pixel P. In one pixel P (or pixel region PA), the central portions of the light emitting regions EA1, EA2, EA3, and EA4 are aligned with the central portion CP of the pixel P or spaced apart from the central portion CP of the pixel P.

The circuit regions CA1, CA2, CA3, and CA4 of each of the first to fourth sub-pixels SP1, SP2, SP3, and SP4 may be disposed around the corresponding light emitting regions EA1, EA2, EA3, and EA4. The circuit regions CA1, CA2, CA3, and CA4 may include a circuit for emitting a corresponding sub-pixel and pixel driving lines. For example, the circuit regions CA1, CA2, CA3, and CA4 may be expressed as a non-light-emitting region, a non-opening region, a non-light-emitting portion, a non-opening portion, or a peripheral portion.

Alternatively, in order to increase an aperture ratio of the sub-pixels SP1, SP2, SP3, and SP4 corresponding to the size of the light emitting regions EA1, EA2, EA3, and EA4 or to reduce a pixel pitch D1 according to high resolution of the pixel P, the light emitting regions EA1, EA2, EA3, and EA4 of each of the first to fourth sub-pixels SP1, SP2, SP3, and SP4 may be extended onto the circuit regions CA1, CA2, CA3, and CA4 so as to overlap some or all of the circuit regions CA1, CA2, CA3, and CA4. For example, the light emitting regions EA1, EA2, EA3, and EA4 of each of the first to fourth subpixels SP1, SP2, SP3 and SP4 may be implemented on the substrate 1111 to overlap the corresponding circuit regions CA1, CA2, CA3, and CA4. In this case, the light emitting regions EA1, EA2, EA3, and EA4 may have a size which is the same as or larger than the circuit regions CA1, CA2, CA3, or CA4.

Alternatively, each of the plurality of pixels P according to another example may include first to third sub-pixels SP1, SP2, and SP3.

The light emitting regions EA1, EA2, and EA3 of each of the first to third sub-pixels SP1, SP2, and SP3 may have a rectangular shape having a shorter side parallel to the first direction (X-axis direction) and a longer side parallel to the second direction (Y-axis direction) and may be arranged, for example, in a 1×3 shape or a 1×3 stripe shape. For example, the first subpixel SP1 may be a red subpixel, the second subpixel SP2 may be a blue subpixel, and the third subpixel SP3 may be a green subpixel.

Figure 11A:
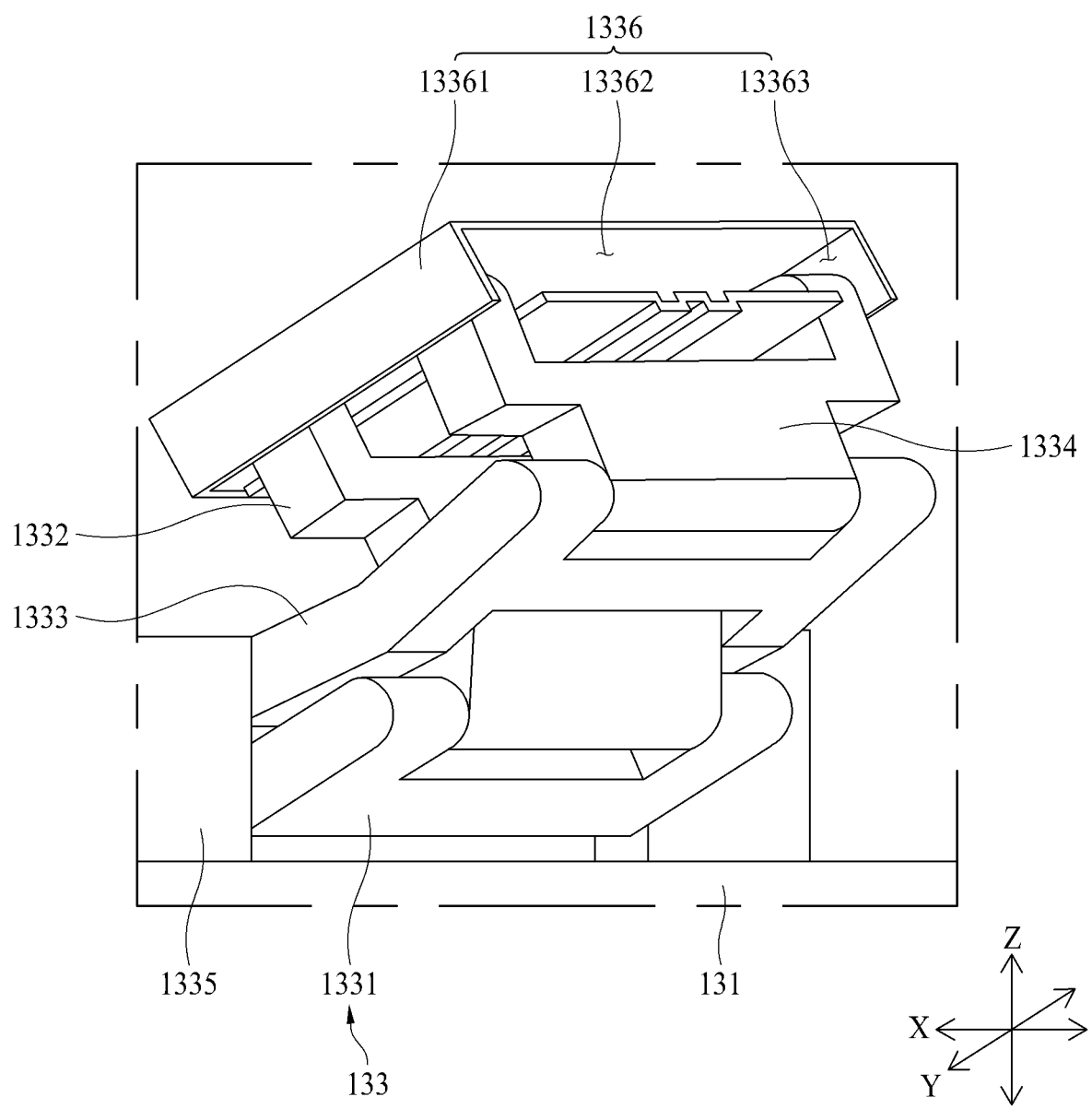
FIG. 11A is a schematic perspective view showing another aspect of a link structure of a display apparatus according to an aspect of the present disclosure.
Figure 11B:
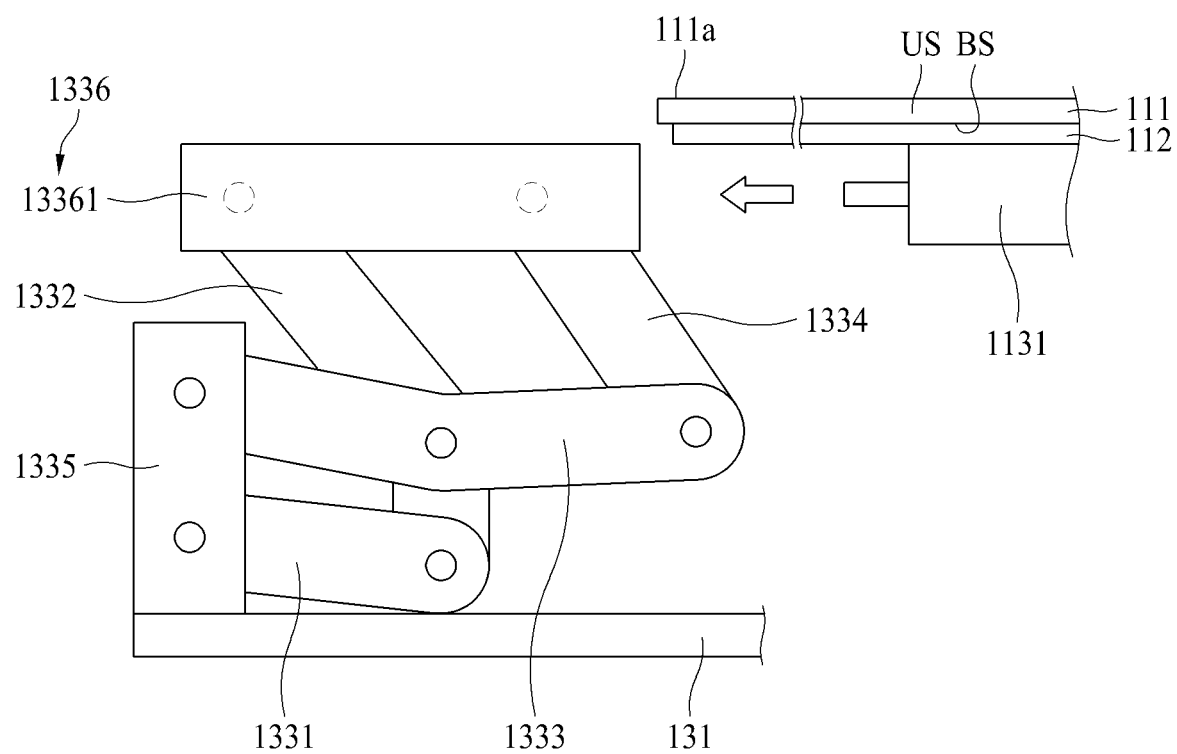
FIG. 11B is a schematic operation state diagram showing that a first connector is coupled to a link structure of FIG. 11A.

FIG. 11A is a schematic perspective view showing another aspect of a link structure of a display apparatus according to an aspect of the present disclosure, and FIG. 11B is a schematic work state diagram showing that the first connector is coupled to the link structure of FIG. 11A.

In the case of the link structure 133 according to FIG. 5A described above, the sixth link member 1336, that is, the second connector, is connected to each of the second link member 1332 and the fourth link member 1334 inside (or on an inner surface) of the second link member 1332 and the fourth link member 1334. Accordingly, a length of the sixth link member 1336 in the second direction (Y-axis direction) according to FIG. 5A may be shorter than a length of the second link member 1332 in the second direction (Y-axis direction). Therefore, the length of the first connector inserted into the sixth link member 1336 may be shorter than the length of the second link member 1332 in the second direction (Y-axis direction).

In contrast, in the case of the link structure 133 according to FIG. 11A, the sixth link member 1336 is provided to be larger than the second link member 1332, so that a portion of each of the second link member 1332 and the fourth link member 1334 may be inserted into the sixth link member 1336. Accordingly, in the case of the link structure 133 according to FIG. 11A, the length of the first connector inserted into the sixth link member 1336 may be equal to or longer than the length of the second link member 1332 in the second direction (Y-axis direction). The sixth link member 1336 according to FIG. 11A may include a case 13361, a first insertion recess 13362, and a second insertion recess 13363.

The case 13361 forms the overall appearance of the sixth link member 1336 and may be coupled to the outside (or outer surface) of each of the second link member 1332 and the fourth link member 1334 to protect the first connector 1131 inserted into the first insertion recess 13362.

A portion of a lower surface of the case 13361 may be removed so that a portion of each of the second link member 1332 and the fourth link member 1334 may be inserted therein as shown in FIG. 11A, and a portion of a side surface of the case 13361 may be removed so that the first connector 1131 is inserted therein, thus having a square plate shape.

The first insertion recess 13362 is for inserting the first connector 1131, and may be located in the central portion of the case 13361. The first insertion recess 13362 may be formed as the inside of the case 13361 is formed to be empty. The first insertion recess 13362 may communicate with the second insertion recess 13363 as shown in FIG. 11A.

The second insertion recess 13363 is for inserting a portion of each of the second link member 1332 and the fourth link member 1334, and may be located on the edge side inside the case 13361. More specifically, the second side 1332b of the second link member 1332 and the second side 1334b of the fourth link member 1334 may be inserted into the second insertion recess 13363, and the second insertion recess 13363 may be positioned between the side surface of the case 13361 and the first insertion recess 13362. Like the first insertion recess 13362, the second insertion recess 13363 may be formed as the inside of the case 13361 is empty, and may communicate with the first insertion recess 13362.

A certain space may be formed between the upper surface of the case 13361 and the second link member 1332 and between the upper surface of the case 13361 and the fourth link member 1334 according to the degree to which a portion of each of the second link member 1332 and the fourth link member 1334 is inserted into the second insertion recess 13363. In this case, when the first connector 1131 is inserted into the first insertion recess 13362, the central portion of the first connector 1131 may be located in the first insertion recess 13361, and the edge of the first connector 1131 may be located in the insertion recess 13363.

Accordingly, the display apparatus 100 having the link structure 133 according to FIG. 11A may secure a space for inserting the first connector 1131 further, compared with the display apparatus 100 having the link structure 133 according to FIG. 5A, the first connector 1131 having a larger size than that of the display apparatus 110 according to FIG. 5A may be coupled.

Meanwhile, referring to FIGS. 11A and 11B, the link structure 133 according to FIG. 11A is provided with a larger size than the link structure 133 according to FIG. 5A, so that an area in contact with the rear surface BS of the display panel 111 (or the rear surface of the back plate 112) is larger, so that the display panel 111 may be more firmly supported. Although FIG. 11B shows that the sixth link member 1336 and the first connector 1131 are coupled in the closed position, the sixth link member 1336 and the first connector 1131 may be coupled in the open position.

Figure 12:
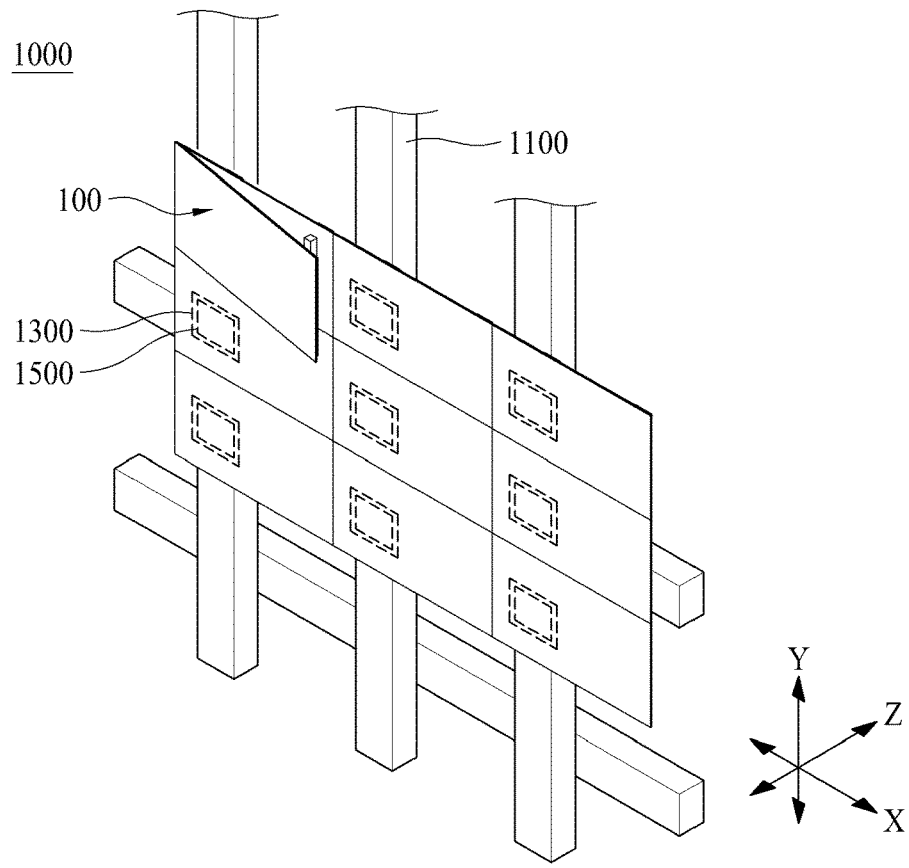
FIG. 12 is a schematic perspective view of a tiled display apparatus according to an aspect of the present disclosure.
Figure 13:
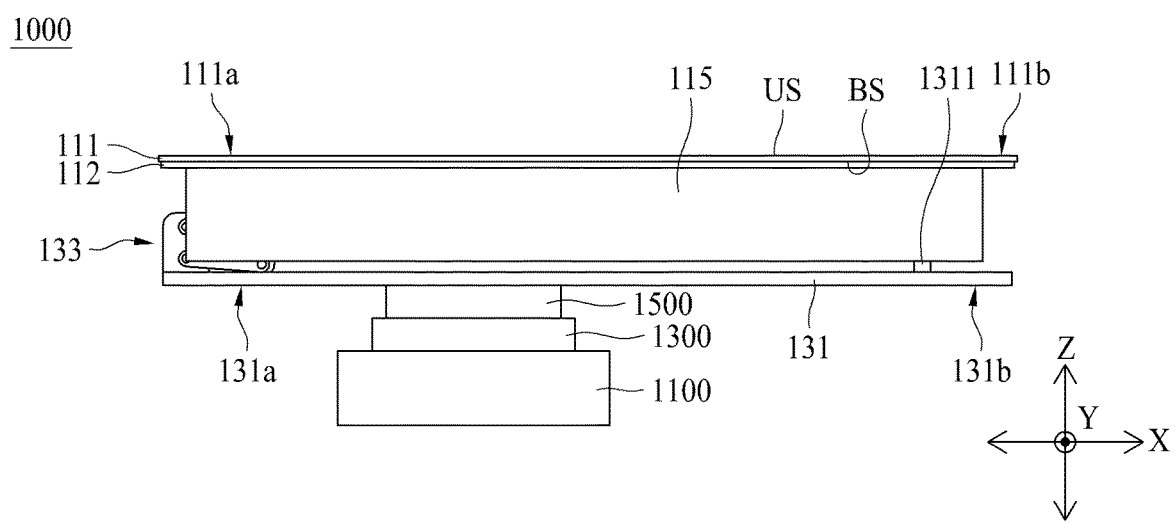
FIG. 13 is a schematic bottom view of a tiled display apparatus according to an aspect of the present disclosure.

FIG. 12 is a schematic perspective view of a tiled display apparatus according to an aspect of the present disclosure, and FIG. 13 is a schematic bottom view of a tiled display apparatus according to an aspect of the present disclosure.

Referring to FIGS. 12 and 13, the tiled display apparatus 1000 according to an aspect of the present disclosure may include a stand frame 1100, a plurality of support brackets 1300, a plurality of positioning modules 1500, and a plurality of display apparatuses 100 of FIGS. 1 to 11B.

The stand frame 1100 is supported on a floor or a wall to support the display apparatus 100. As shown in FIG. 12, the stand frame 1100 may include a plurality of first frames arranged in the first direction (X-axis direction) (or horizontal direction) and a plurality of second frames arranged in the second direction (Y-axis direction) (or vertical direction).

The plurality of first frames may be disposed parallel to each other in the first direction (X-axis direction) and spaced apart from each other in the second direction (Y-axis direction). The plurality of second frames may be disposed parallel to each other in the second direction (Y-axis direction) and spaced apart from each other in the first direction (X-axis direction). The plurality of first frames and the plurality of second frames may be coupled to each other to cross each other, so that a bearing force for supporting the plurality of display apparatuses 100 may be improved.

The plurality of first frames and the plurality of second frames may be each formed of a metal material to support the plurality of display apparatuses 100, but are not limited thereto, and the plurality of first frames and the plurality of second frames may be formed of any other material as long as it may support the plurality of display apparatuses 100.

The plurality of support brackets 1300 may be disposed on the stand frame 1100. The plurality of support brackets 1300 according to an example may be coupled to the second frame and disposed to be spaced apart from each other in the second direction (Y-axis direction). Here, a distance by which the plurality of support brackets 1300 are spaced apart may be equal to or greater than the length of the shorter side of the display apparatus 100 (or the display panel 111). If the distance by which the plurality of support brackets 1300 are spaced apart is smaller than the length of the shorter side of the display apparatus 100 (or the display panel 111), the edges of the plurality of display apparatuses 100 (or the display panel 111) may overlap each other, so that they cannot be coupled to the stand frame 1100 or the display apparatus 100 (or the display panel 111) may be damaged.

As another example, the plurality of support brackets 1300 may be coupled to the first frame. In this case, the plurality of support brackets 1300 may be disposed to be spaced apart from each other in the first direction (X-axis direction), and the distance by which the plurality of support brackets 1300 are spaced apart from each other may be equal to or greater than the length of the longer side the display apparatus 100 (or the display panel 111).

Each of the plurality of support brackets 1300 may be fixed to the first frame or the second frame through bolt coupling or the like. Accordingly, a rear surface of each of the plurality of support brackets 1300 may be in contact with the first frame or the second frame.

The plurality of positioning modules 1500 may be individually connected to a plurality of support brackets 1300. The plurality of positioning modules 1500 are to adjust the positions of each of the plurality of display apparatuses 100 that are individually coupled, and may be coupled to the front surface of the support bracket 1300 as shown in FIG. 13. A plurality of display apparatuses 100 may be individually coupled (or tiled) to the front surface of the plurality of positioning modules 1300, and more specifically, to the fixed frame 131 of the support module 130.

The positioning module 1500 is to move the display apparatus 100 in different three-axis directions, that is, the first direction (X-axis direction), the second direction (Y-axis direction), and the third direction (Z-axis direction) with respect to the support bracket 1300. That is, the positioning module 1500 may be positioned between the support bracket 1300 and the display apparatus 100 to rotate a plurality of positioning members such as bolts, thereby adjusting the position of the display apparatus 100 in three different three-axis directions.

Therefore, in the tiled display apparatus 1000 according to an aspect of the present disclosure, the plurality of display apparatuses 100 may be coupled to the stand frame 1100 through the plurality of support brackets 1300 and the plurality of positioning modules 1500, and in particular, since the positions of each of the plurality of display apparatuses 100 may be adjusted through the plurality of positioning modules 1500 individually coupled to each of the plurality of display apparatuses 100, it is possible to more effectively prevent the plurality of display apparatus 100 from interfering with each other during replacement, repair, or installation, and realize a unified image.

The display apparatus according to the present disclosure is provided to rotate the display module with respect to the fixed frame through the link structure disposed between the fixed frame and the display module, so that the display module may be easily attached to and detached from the fixed frame, thereby shortening replacement, repair, or installation work time for the display module.

In the tiled display apparatus according to the present disclosure, a plurality of display apparatuses may be disposed not to interfere with each other through the link structure formed as a six-bar link during replacement or installation, thereby shortening the replacement and installation work time.

In the tiled display apparatus according to the present disclosure, since the positions of each of the plurality of display apparatuses may be moved in the three-axis direction through the plurality of positioning modules coupled to the stand frame, the plurality of display apparatuses may be provided to output an image having a sense of unity.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:
a display module; and
a support module including a fixed frame configured to support the display module and a link structure disposed between the fixed frame and the display module and configured to rotate the display module through at least a six-bar link structure,
wherein the display module includes:
a display panel;
a circuit plate coupled to a rear surface of the display panel and having a first connector; and
a main body disposed on a rear surface of the circuit plate and coupled to the display panel, and
wherein the main body includes:
a receiving recess for receiving the circuit plate; and
a coupling recess allowing the link structure to be inserted therein so as to be connected to the first connector.

2. The display apparatus of claim 1, wherein the link structure is disposed between one edge portion of the fixed frame and one edge portion of the display module.

3. The display apparatus of claim 1, wherein the link structure includes:
a first link member having a first side and a second side;
a second link member having a first side connected to the second side of the first link member;
a third link member having a first side connected to the fifth link member so as to be spaced apart from the first link member, a connection portion connected to the second link member, and a second side extending from the connection portion;
a fourth link member having a first side connected to the second side of the third link member;
a fifth link member coupled to the first side of the first link member and the first side of the third link member and coupled to the fixed frame; and a sixth link member connected to the second side of the second link member and the second side of the fourth link member.

4. The display apparatus of claim 3, wherein,
in the fifth link member, the first side and the second side are positioned in a first imaginary line corresponding to a thickness direction of the display panel,
in the sixth link member, the first side and the second side are positioned in a second imaginary line corresponding to a length direction of the display panel, and
in each of the first link member, the second link member, the third link member, and the fourth link member, the first side and the second side are positioned on a third imaginary line corresponding to a diagonal direction between the thickness direction and the length direction of the display panel.

5. The display apparatus of claim 1, wherein the fixed frame includes a support portion disposed on the fixed frame to support the main body.

6. The display apparatus of claim 5, wherein the support portion is formed of a magnetic material, and the main body disposed in a position corresponding to the support portion is formed of a metallic material.

7. The display apparatus of claim 3, wherein the sixth link member is a second connector for driving the display module, and the second connector is coupled to the first connector of the display module.

8. The display apparatus of claim 7, wherein the second connector is connected to each of the second link member and the fourth link member on an inner surface of each of the second link member and the fourth link member.

9. The display apparatus of claim 7, wherein the second connector includes:
a case;
a first insertion recess positioned in a center of the case and allowing the first connector to be inserted therein; and
a second insertion recess positioned between the case and the first insertion recess and allowing the second side of the second link member and the second side of the fourth link member to be inserted therein.

10. The display apparatus of claim 3, wherein the first side and the second side of the fifth link member are fixed to the fixed frame,
the first link member is rotatably coupled to the first side of the fifth link member with respect to the first side of the fifth link member,
the third link member is rotatably coupled to the second side of the fifth link member with respect to the second side of the fifth link member,
the second link member is rotatably coupled to the second side of the first link member and the first side of the sixth link member based on the connection member of the third link member,
the fourth link is rotatably coupled to the second side of the third link member and the second side of the sixth link member, and
the sixth link member is rotatably coupled to the second side of the second link member and the second side of the fourth link member.

11. The display apparatus of claim 1, wherein the display module is positioned in a closed position parallel to the fixed frame or in an open position inclined with respect to the fixed frame.

12. The display apparatus of claim 3, wherein, when a length of the first link member is r1,
a length of the second link member is r2,
a length from the first side of the second link member to the connection portion is r2-1,
a length from the connection portion to the second side of the second link member is r2-2,
a length from the first side of the third link member to the connection portion is r3-1,
a length from the connection portion to the second side of the third link member is r3-2,
a length of the fourth link member is r4,
a length of the fifth link member is r5, and
a length of the sixth link member is r6,
r1 is greater than r3-1 and smaller than r2,
r4 is greater than r2-2, and
r5 is smaller than r6.

13. The display apparatus of claim 11, wherein the display module includes one side to which the link structure is coupled; and
another side spaced apart from the one side,
wherein when the display module is switched from the closed position to the open position,
the one side of the display module is not interfered with first display module adjacent to the one side of the display module, and
another side of the display module is not interfered with second display module adjacent to the another side of the display module.

14. The display apparatus of claim 13, wherein the display module does not overlap with the first display module and the second display module in the closed position, and
the display module overlaps with the first display module in a thickness direction of the first display module in the open position.

15. A display apparatus comprising:
a display module; and
a support module including a fixed frame configured to support the display module and a link structure disposed between the fixed frame and the display module and configured to rotate the display module through at least a six-bar link structure,
wherein the display module includes a display panel, and
wherein the display panel includes a substrate, and a display unit including a plurality of pixels arranged on the substrate, and
wherein a size of the display unit is equal to a size of the substrate.

16. The display apparatus of claim 15, wherein each of the plurality of pixels is arranged at a first interval on the substrate,
wherein the first interval is a distance between centers of two adjacent pixels, and
a second interval between centers of outermost pixels among the plurality of pixels and an outer surface of the substrate is equal to or less than a half of the first interval.

17. A tiled display apparatus comprising:
a stand frame;
a plurality of support brackets arranged in the stand frame;
a plurality of positioning modules individually connected to the plurality of support brackets, respectively; and
a plurality of display apparatuses individually tiled to the plurality of positioning modules,
wherein each of the plurality of display apparatuses includes the display apparatus including a display module, and a support module including a fixed frame configured to support the display module and a link structure disposed between the fixed frame and the display module and configured to rotate the display module through at least a six-bar link structure.

18. The tiled display apparatus of claim 17, wherein the positioning module is coupled to the support bracket and the display apparatus so that the display apparatus moves in 5 different 3-axis directions with respect to the support bracket.

\* \* \* \* \*